US008887134B2

(12) United States Patent
Weatherhead et al.

(10) Patent No.: US 8,887,134 B2
(45) Date of Patent: Nov. 11, 2014

(54) CUSTOMIZED OBJECT DESIGN FOR INDUSTRIAL AUTOMATION APPLICATION

(71) Applicant: Rockwell Automation Technologies, Inc., Mayfield Heights, OH (US)

(72) Inventors: Norman Weatherhead, Ayr (CA); Andrew R. Stump, Mentor, OH (US); Haithem Mansouri, Beachwood, OH (US); Axel Rodriguez, Aurora, OH (US); Joachim Thomsen, Singapore (SG)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 34 days.

(21) Appl. No.: 13/670,144

(22) Filed: Nov. 6, 2012

(65) Prior Publication Data

US 2014/0129181 A1 May 8, 2014

(51) Int. Cl.
*G06F 9/44* (2006.01)

(52) U.S. Cl.
USPC .......................... 717/121; 717/107; 717/120

(58) Field of Classification Search
USPC .................. 717/104–109, 120–123
See application file for complete search history.

(56) References Cited

U.S. PATENT DOCUMENTS

| | | | |
|---|---|---|---|
| 5,801,701 A | 9/1998 | Koppolu et al. | |
| 6,170,081 B1 | 1/2001 | Fontana et al. | |
| 6,185,733 B1 | 2/2001 | Breslau et al. | |
| 6,321,374 B1 * | 11/2001 | Choy | 717/106 |
| 6,405,364 B1 * | 6/2002 | Bowman-Amuah | 717/101 |
| 6,430,556 B1 * | 8/2002 | Goldberg et al. | 1/1 |
| 6,571,232 B1 | 5/2003 | Goldberg et al. | |
| 6,601,234 B1 * | 7/2003 | Bowman-Amuah | 717/108 |
| 6,662,357 B1 * | 12/2003 | Bowman-Amuah | 717/120 |
| 6,981,215 B1 * | 12/2005 | Lindhorst et al. | 715/207 |
| 6,999,956 B2 * | 2/2006 | Mullins | 1/1 |
| 7,103,874 B2 * | 9/2006 | McCollum et al. | 717/121 |
| 7,222,114 B1 | 5/2007 | Chan | |
| 7,322,024 B2 * | 1/2008 | Carlson et al. | 717/120 |
| 7,434,203 B2 | 10/2008 | Stienhans et al. | |
| 7,454,743 B2 * | 11/2008 | Fuchs | 717/108 |
| 7,472,375 B2 | 12/2008 | Ye et al. | |

(Continued)

FOREIGN PATENT DOCUMENTS

WO 0116725 A2 3/2001

OTHER PUBLICATIONS

Sato et al, "Exploratory Analysis of Collaborative Web Accessibility Improvement", ACM Transactions on Accessible Computing, vol. 3, No. 2, Article 5, pp. 1-30, 2010.*
Schatzl et al, "Optimized Memory Management for Class Metadata in a JVM", ACM, pp. 151-160, 2011.*

(Continued)

*Primary Examiner* — Anil Khatri
(74) *Attorney, Agent, or Firm* — Amin, Turocy & Watson, LLP

(57) ABSTRACT

Described herein are systems, methods and apparatuses that can provide an approach to facilitate the design of objects (e.g., modular objects that can facilitate industrial automation applications). The design approach includes: facilitate a display of configuration data representing a configuration of objects selected for an application; analysis of metadata associated with an object of the configuration of objects; and generation of suggestion data representing a suggestion regarding an optimization of the configuration of the objects for the application based on the analysis of the metadata.

17 Claims, 21 Drawing Sheets

(56) References Cited

U.S. PATENT DOCUMENTS

| | | | |
|---|---|---|---|
| 7,546,576 B2* | 6/2009 | Egli | 717/106 |
| 7,565,643 B1 | 7/2009 | Sweet et al. | |
| 7,721,259 B2* | 5/2010 | Heinke et al. | 717/121 |
| 7,865,873 B1 | 1/2011 | Zoellner et al. | |
| 7,877,731 B2* | 1/2011 | Bekelman | 717/123 |
| 7,949,997 B2* | 5/2011 | Chessell et al. | 717/120 |
| 7,958,486 B2* | 6/2011 | Tsyganskiy et al. | 717/105 |
| 7,966,523 B2 | 6/2011 | Weatherhead | |
| 8,010,940 B2 | 8/2011 | van Wyk et al. | |
| 8,069,437 B2 | 11/2011 | Aigner et al. | |
| 8,219,974 B2* | 7/2012 | Schmidt | 717/120 |
| 8,423,950 B2* | 4/2013 | Dettinger et al. | 717/104 |
| 8,448,137 B2* | 5/2013 | Kaetker et al. | 717/121 |
| 8,458,215 B2 | 6/2013 | Dettinger et al. | |
| 8,584,081 B2 | 11/2013 | Fernando et al. | |
| 8,713,527 B2* | 4/2014 | Frontiero et al. | 717/122 |
| 2002/0111829 A1 | 8/2002 | Robibero | |
| 2005/0114288 A1 | 5/2005 | Dettinger et al. | |
| 2006/0150148 A1 | 7/2006 | Beckett et al. | |
| 2007/0220415 A1 | 9/2007 | Cheng et al. | |
| 2008/0098378 A1 | 4/2008 | Kilbane et al. | |
| 2009/0031291 A1 | 1/2009 | Adams | |
| 2009/0327991 A1 | 12/2009 | Weatherhead | |
| 2009/0327992 A1 | 12/2009 | Weatherhead | |
| 2010/0042376 A1 | 2/2010 | Weatherhead | |
| 2010/0050020 A1 | 2/2010 | Weatherhead | |
| 2010/0082145 A1 | 4/2010 | Weatherhead et al. | |
| 2010/0250867 A1 | 9/2010 | Bettger et al. | |
| 2011/0022987 A1 | 1/2011 | Brubaker | |
| 2012/0078431 A1 | 3/2012 | Weatherhead | |
| 2012/0078432 A1 | 3/2012 | Weatherhead et al. | |
| 2012/0079157 A1 | 3/2012 | Weatherhead | |

OTHER PUBLICATIONS

Corcho et al, "Grid Metadata Management: requirements and architecture", IEEE, pp. 97-104, 2007.*

Kackl et al, Synchronous Metadata Management of Large Storage Systems, ACM, pp. 1-6, 2010.*

Non-Final Office Action for U.S. Appl. No. 13/670,051, dated Mar. 16, 2014, 22 pgs.

European Search Report dated Jun. 13, 2014 for EP Application No. 13 19 1731, 6 pages.

European Search Report dated Jul. 28, 2014 for EP Application No. 13 19 1728, 9 pages.

Vyatkin, et al, "OOONEIDA: An Open, Object-Oriented Knowledge Economy for Intelligent Industrial Automation", IEEE Transactions on Industrial Informatics, pp. 4-17, vol. 1, No. 1, Feb. 2005, 14 pages.

Notice of Allowance dated Jul. 21, 2014 for U.S. Appl. No. 13/670,051, 21 pages.

Manolescu, "Workflow Enactment with Continuation and Future Objects", ACM, pp. 40-51, 2002. Retrieved on Jul. 21, 2014, 12 pages.

Javadi et al, "Decentralized Orchestration of Data-centric Workflows Using the Object Modelling System" 2012 12th IEEE/ACM International Symposium on Cluster, Cloud and Grid Computing. Retrieved on Jul. 21, 2014, 8 pages.

Harrison, et al, "Object Reuse and Exchange for Publishing and Sharing Workflows", ACM, pp. 67-76, 2011.

Kappel, et al, a Framework for Workflow Management Systems Based on Objects, Rules and Roles, ACM, pp. 1-5, 2000.

Non-Final Office Action dated Jun. 16, 2014 for U.S. Appl. No. 13/670,156, 33 pages.

Non-Final Office Action dated May 30, 2014 for U.S. Appl. No. 13/670,172, 49 pages.

* cited by examiner

US 8,887,134 B2

CUSTOMIZED OBJECT DESIGN FOR INDUSTRIAL AUTOMATION APPLICATION

TECHNICAL FIELD

This disclosure generally relates to the facilitation of design of objects for industrial automation applications.

BACKGROUND

Industrial automation generally refers to the use of control systems to increase the productivity and/or quality of an industrial process. An "industrial process" generally refers to any process that facilitates the production of goods or the delivery of services. A "control system" generally refers to a device or set of devices that manage, command, direct, or regulate the behavior of other devices utilized within an industrial process.

An industrial process often requires communication and functional cooperation between different devices. When users purchase the different devices utilized in the industrial process from different vendors, there is often limited interoperability and consistency between devices, making communication and functional cooperation difficult. Often the control system needs to utilize a complex program for integration of the different devices to facilitate the communication and functional cooperation between the different devices.

Objects, such as modular objects, can be used to facilitate the integration of the different devices, providing a standard programming tool that can interface between the different devices. The use of objects can increase interoperability and consistency between the different devices. However, object design tools are generally static, employing a top-down approach to object design.

The above-described background is merely intended to provide an overview of contextual information regarding object design, and is not intended to be exhaustive. Additional context may become apparent upon review of one or more of the various non-limiting embodiments of the following detailed description.

SUMMARY

The following presents a simplified summary to provide a basic understanding of some aspects of the subject disclosure. This summary is not an extensive overview of the disclosed subject matter. It is not intended to identify key or critical elements of the disclosed subject matter, nor is it intended to delineate the scope of the subject disclosure or the claims. Its sole purpose is to present some concepts of the disclosed subject matter in a simplified form as a prelude to the more detailed description presented later.

In a non-limiting embodiment of the subject disclosure, a system is described that can facilitate the design of objects. The system includes a memory that stores computer-executable instructions and a processor that facilitates execution of the computer-executable instructions to at least: select an object from a data store of a plurality of objects; filter first data representing functionalities of the object based on second data representing a workflow of an application resulting the first data comprising third data representing filtered functionalities and fourth data representing unfiltered functionalities; and facilitate a display of the fourth data representing unfiltered functionalities for customization of the object for the application while masking the third data representing the filtered functionalities.

In another non-limiting embodiment, a method is described that can facilitate the design of objects. The method includes: selecting, by a system including a processor, an object from a library of object data; filtering, by the system, a parameter of the object based on workflow data defining a workflow of an application; and facilitating, by the system, a display of the object including masking the filtered parameter of the object to facilitate a customization of the object for the application.

In a further non-limiting embodiment, a non-transitory computer readable storage medium having stored thereon computer executable instructions that, in response to execution, cause a computing device including a processor to perform operations that can facilitate the design of objects. The operations include: selecting an object from a library of a plurality of objects; filtering a parameter of the object based on a role of an entity selecting the object; and displaying an unfiltered parameter of the object and masking the filtered parameter to facilitate customization of the object for an application.

According to another non-limiting embodiment of the subject disclosure, a system is described that can facilitate the design of objects. The system includes a memory that stores computer-executable instructions and a processor that facilitates execution of the computer-executable instructions to at least: facilitate a display of configuration data representing a configuration of objects selected for an application; analyze metadata associated with an object of the configuration of objects; and generate a suggestion regarding an optimization of the configuration of the objects for the application based on the analysis of the metadata.

In another non-limiting embodiment, a method is described that can facilitate the design of objects. The method includes: facilitating, by a system including a processor, a display of a design of an application comprising a plurality of objects; analyzing, by the system, metadata associated with an object from the plurality of objects; and generating, by the system, suggestion data representing a suggestion regarding an optimization of the application based on the analysis of the metadata.

In a further non-limiting embodiment, a non-transitory computer readable storage medium having stored thereon computer executable instructions that, in response to execution, cause a computing device including a processor to perform operations that can facilitate the design of objects. The operations include: displaying a configuration of an application comprising a plurality of objects; analyzing metadata associated with an object from the configuration; and suggesting a feature with which to optimize the configuration based on the analyzing the metadata.

According to a further non-limiting embodiment of the subject disclosure, a system is described that can facilitate the design of objects. The system includes a memory that stores computer-executable instructions and a processor that facilitates execution of the computer-executable instructions to at least: search for an object to be used in a design task according to a feature of the design task; retrieve a plurality of search results corresponding to a plurality of objects satisfying the feature of the design task; and filter the plurality of search results according to a type of the design task.

In another non-limiting embodiment, a method is described that can facilitate the design of objects. The method includes: conducting, by a system including a processor, a search for an object to be used in a design task based on a feature of the design task; retrieving, by the system, a plurality of search results corresponding to a plurality of objects satisfying the feature of the design task; and filtering, by the system, the plurality of search results according to a context of the design task.

In a further non-limiting embodiment, a non-transitory computer readable storage medium having thereon computer executable instructions that, in response to execution, cause a computing device including a processor to perform operations that can facilitate the design of objects. The operations include: searching for an object to be used in a design task based on a context of the design task; filtering a plurality of search results according to the availability of an object; and recommending an object filtered from the plurality of search results for the design task.

According to another non-limiting embodiment of the subject disclosure, a system is described that can facilitate the design of objects. The system includes a memory that stores computer-executable instructions and a processor that facilitates execution of the computer-executable instructions to at least: display a set of objects associated with a set of descriptors; display a set of functionalities required for an application; associate a portion of the set of objects with the set of functionalities, wherein the portion of the set of descriptors associated with the set of objects matches the set of functionalities; and design a workflow based on the set of objects.

In another non-limiting embodiment, a method is described that can facilitate the design of objects. The method includes: displaying, by a system including at least one processor, a set of objects associated with a set of descriptors; displaying, by the system, a set of functionalities required for an application; associating, by the system, a subset of the set of objects with the set of functionalities, wherein the subset of descriptors associated with the subset of objects matches the set of functionalities; and designing, by the system, a workflow based on the set of objects.

In a further non-limiting embodiment, a non-transitory computer readable storage medium having stored thereon computer executable instructions that, in response to execution, cause a computing device including a processor to perform operations that can facilitate the design of objects. The operations include: displaying a set of objects associated with a set of descriptors; displaying a set of functionalities required for an application; associating a subset of the set of objects with the set of functionalities, wherein the subset of descriptors associated with the subset of objects matches the set of functionalities; and designing an application based on the set of objects.

The following description and the annexed drawings set forth in detail certain illustrative aspects of the disclosed subject matter. These aspects are indicative, however, of a few of the various ways in which the principles of the innovation may be employed. The disclosed subject matter is intended to include all such aspects and their equivalents. Other advantages and distinctive features of the disclosed subject matter will become apparent from the following detailed description of the innovation when considered in conjunction with the drawings.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

In the following description, numerous specific details are set forth to provide a thorough understanding of the embodiments of the subject disclosure. One skilled in the relevant art will recognize, however, that the embodiments described herein can be practiced without one or more of the specific details, or with other methods, components, materials, etc. In other instances, well-known structures, materials, or operations are not shown or described in detail to avoid obscuring certain aspects.

According to an aspect of the subject disclosure, described herein are systems, apparatuses and methods that employ a holistic, bottom-up approach to facilitate the design of objects to be used by control systems to manage, command, direct, or regulate the behavior of other devices utilized within an industrial process. Examples of control systems include programmable logic controllers (PLCs), programmable automation controllers (PACs) and any other control device that can be utilized within an industrial process.

The phrase, "design of objects," generally refers to any aspect of customization of objects to be used by one or more control systems. The objects can be retrieved from any data store, referred to generally as a "library." After customization, the objects can be stored in a library so that they can be re-used or further customized. The library can store unmodified objects ("standard objects") and customized objects (or instances of an unmodified object). The standard objects and the customized objects can be differentiated to facilitate discovery of both types of objects. Additionally, the library can also store applications created by linking objects. In an embodiment, the library can hold both objects and applications. In another embodiment, the applications can be converted to searchable objects that can be stored and/or searched similarly to standard objects. In this case, applications converted to searchable objects have all the same metadata.

Figure 1:
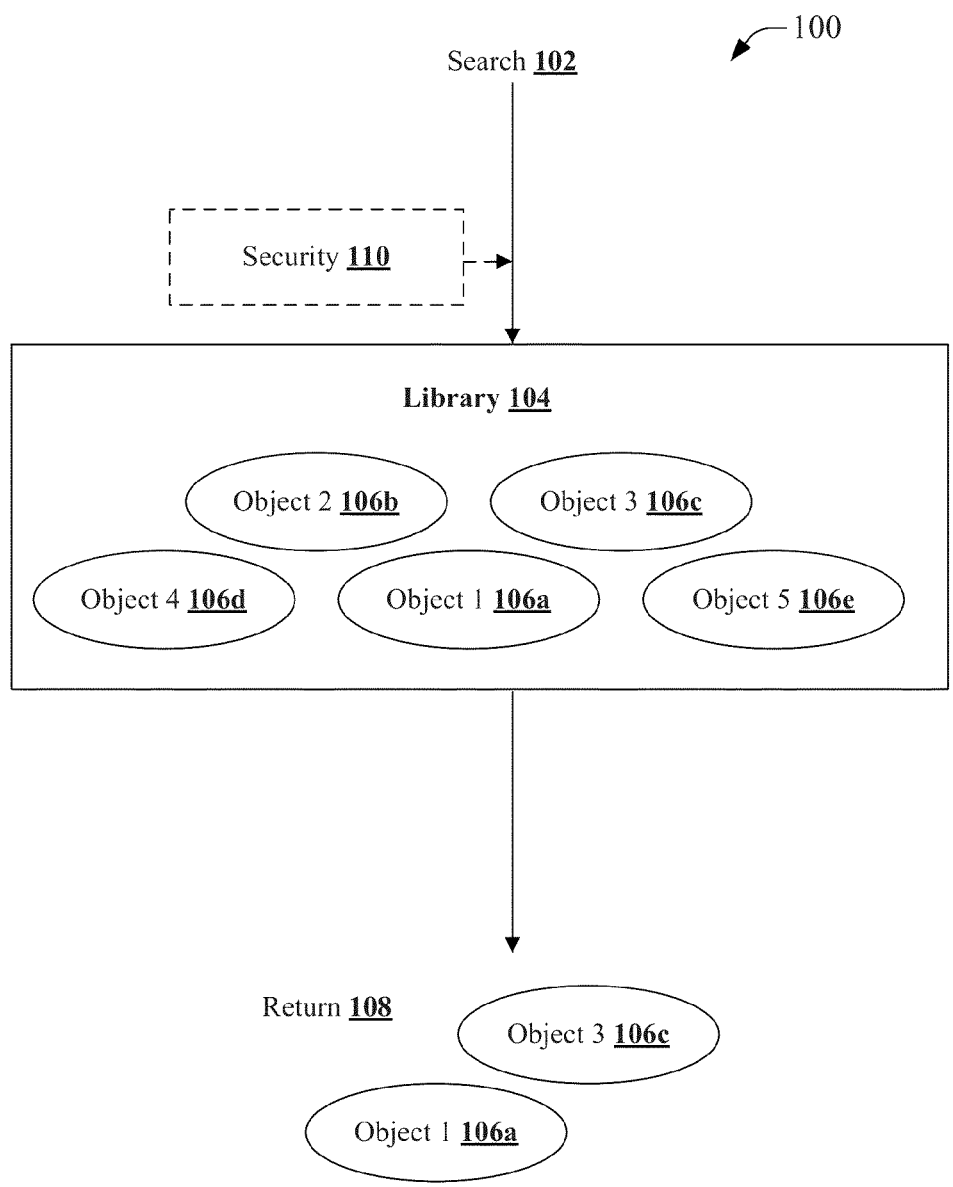
FIG. 1 is a schematic illustration of a system that facilitates searching for objects in a library, according to an embodiment of the subject disclosure.

Referring now to FIG. 1, illustrated is a system 100 that facilitates searching for objects 106a-106e in a library 104, according to an embodiment of the subject disclosure. The term "library" generally refers to any type of data store that can store an object (or multiple objects 106a-106e). Although five objects 106a-e are illustrated in FIG. 1, it will be understood that the library 104 can include any number of objects from 1-N, where N is an integer greater than or equal to one.

The library 104 can store unmodified objects ("standard objects") and customized objects (or instances of an unmodified object). The library 104 can store the standard objects and the customized objects and can represent the standard objects and the customized objects differently to facilitate discovery of both types of objects.

The library 104 can also store applications that have been created by linking two or more objects. In an embodiment, an application can be stored differently from an object (either standard or customized). For example, the library 104 can store an object and an application, where a search of the library 104 for an object would not return an application and vice versa. In another embodiment, the applications can stored as an object type with a certain type of metadata. The library 104 can store the applications as searchable objects that can be searched similarly to other objects. For example, applications converted to objects have metadata indicating that they are applications.

When used herein, the term "library" refers to a single library or to a set of libraries. The single library or set of libraries can include one or more global libraries (public libraries) and/or one or more local libraries (private libraries). The single library or set of libraries can be hosted at one or more locations. For example, the single library or set of libraries can be distributed across multiple data stores and/or multiple locations.

The library 104 can be accessible according to a security 110 procedure. The security procedure 110 can be different for libraries hosted on different networks (e.g., public networks vs. private networks).

In an example, the library 104 can be a global library, hosted through a public network. For example, a global library can be in the form of a Web application. The global library can be hosted through a public server, available over the Internet, as a cloud computing solution, or the like. The public library is available according to a public security procedure (such as a global security protocol that applies to a set of devices communicatively coupled by a wide area network). The public security procedure can be an open security procedure. The open security procedure can allow viewing of objects in the library to all users, but only enable downloads of the objects upon payment. The public security procedure can also be less open, for example, requiring payment for access to the library 104, but enabling any user who pays access.

In another example, the library 104 can be a private library (or local library). The private library can be accessible through a private network (e.g., a work place intranet, such as a factory network, such as a network according to an industrial protocol, such as EtherNet/IP or Common Industrial Protocol). The private network can employ a private security protocol (such as a local security protocol that applies to a set of devices communicatively coupled by one or more local area networks) such that only authenticated users can access the private library. Access rights can be further limited based on other factors, such as a user's role. For example, a corporate engineer has different access rights to the library than a project engineer. The private library can also be an individual's personal library, where access is restricted to all users except the specific user who owns the personal library.

As used herein, the term "object" generally refers to any piece of software code that can facilitate one or more industrial automation applications. An example of an "object" is a "module" or a "modular object" that can be a reusable and/or customizable piece of software that can be utilized within an industrial process definition to facilitate one or more industrial automation applications. Modular objects allow programmers to concentrate on the functionality of the object rather than the mechanics of implementation.

Objects generally refer to reusable software that can expose functionalities of components (both hardware devices and software) of an industrial automation application, while providing abstraction from details of communication and interaction with such components of the industrial automation application. Objects are also generally customizable. In other words, objects contain code segments that can be quickly and easily customized for a specific application within an industrial automation system. The details of communication and interaction with components of an industrial application can be customized for a specific application without the need for reprogramming the entire code. Additionally, an "object" can be an application previously built that includes two or more individual objects.

Figure 2:
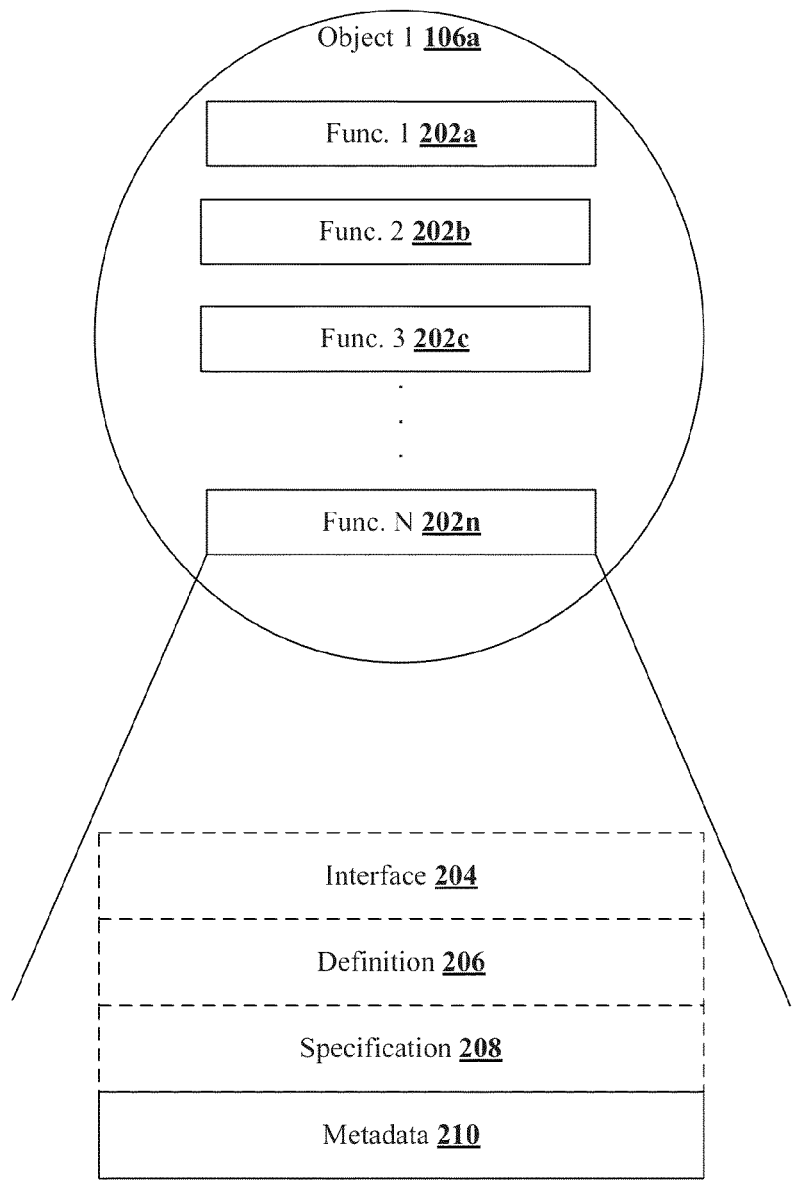
FIG. 2 is a schematic illustration of an object, according to an embodiment of the subject disclosure.

As shown in FIG. 2, an object 106a can include various functionalities 202a-202n. It will be understood that an object can include any number of functionalities from 1-N, where N represents any number greater than 1. It will be understood that an object can also include a single functionality, but the object in FIG. 2 is illustrated including N functionalities.

Functionalities 202a-202n allow the object 106a to be implemented in various applications and/or in connection with different components of the applications. For example, functionality 1 202a can facilitate a first application, while functionality 2 202b can facilitate a second application. The functionalities 202a-202n can be customized to facilitate specific applications within an industrial automation environment.

For example, a factory can have two industrial processes that use the same machine and require the same functionality. However, the two industrial processes produce different products. The functionality is able to be customized to facilitate a first aspect of the first industrial process and a second aspect of the second industrial process.

The object 106a or the functionalities (e.g., Functionality N 202n) include metadata 210 that can facilitate searches for the object 106. For example, referring now to FIG. 1, an entity can search 102 a library 104 for an object 106a-106e with a certain functionality (e.g., Functionality N 202n of object 106a as shown in FIG. 2). If object 1 106a and object 3 106c both include the functionality, object 1 106a and object 3 106c can both be returned 108 in results of the search 102.

The entity performing the search can be any entity within an industrial automation system. The entity, for example, can be a user of equipment, such as an operator or a repair person. An engineer or anyone who customizes programs for an industrial process can also be an entity. Furthermore, the entity can also be an automated device within the industrial automation system.

Referring again to FIG. 2, the metadata 210 can also identify features of the object. Examples of features of the object include, but are not limited to, an identity of the creator of the object 106a or the functionality (e.g., Functionality N 202n, an application in which the object 106a or the functionality (e.g., Functionality N 202n) can be implemented, or a product or component for which the object 106a or the functionality (e.g., Functionality N 202n) has specifically been designed.

The object 106a and/or functionality (e.g., Functionality N 202n) can also include an interface 204 that can enable an entity (or user) to interface with the functionalities 1 202a-N 202n of the object 106a. For example, the entity (or user) can utilize the interface 204 to facilitate customization of the functionalities 1 202a-N 202n.

The object 106a and/or functionality (e.g., Functionality N 202n) can also include a definition 206 and/or a specification 208.

Definition 206, in an example, can refer to one or more reusable definitions. Reusable definitions can include program code that can alter the state of one or more resources in an industrial automation system (e.g., logic code that can control opening and closing of a valve). The one or more reusable definitions 206 can include programming code, for example, ladder logic, function chart, script, JAVA, C code, and so on.

Specification 208 generally refers to an intended implementation or function of the application. As an example, the specification 208 can generally refer to one or more resources within an industrial automation system that can facilitate implementation of the reusable definitions 206 and/or one or more resources within the industrial automation system that can facilitate a workflow. The one or more resources can include one or more of equipment, material, personnel, segments, storage, and so forth. For example, a valve that is opened or closed according to logic code can be an equipment resource. The functionalities can define various reusable definition/resource pairings that can facilitate implementation of the object.

Additionally, the one or more reusable definitions 206 and/or the specification 208 need not only relate to industrial controllers. For example, the reusable definitions 206 and/or the specification 208 can also relate to other devices utilized to facilitate industrial automation. One example of another device that is utilized to facilitate industrial automation is an Operator Interface (or HMI) that can display graphics, information (e.g., dashboard), documentation, or the like. However, it will be understood that the reusable definitions 208 and/or specification 208 can define any application. Control code and an industrial automation system are described merely for simplicity of illustration and explanation.

Figure 3:
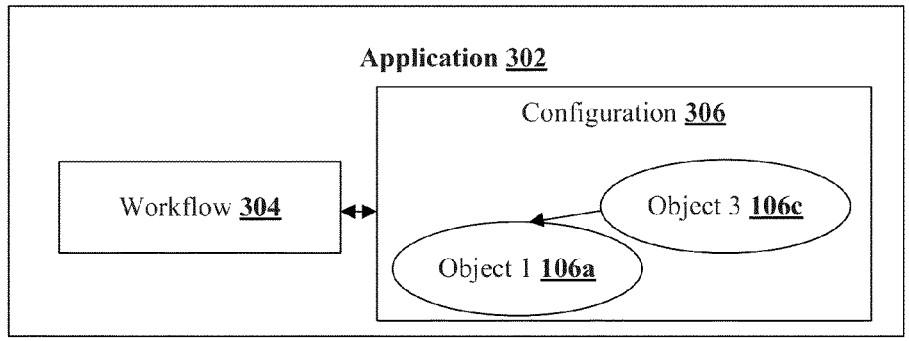
FIG. 3 is a schematic illustration of an application, according to an embodiment of the subject disclosure.

One or more objects form an application. FIG. 3 shows a schematic illustration of an application 302. The term "application" or "industrial automation application," as used herein, generally refers to control code (utilized by a control system) for any process that can facilitate the production of goods or the delivery of services. An application can be, for example, a combination of objects 106a, 106c that satisfy a workflow 304 for a process. The objects 106a, 106c can be arranged in a configuration 306 to satisfy the workflow 304. Although just two objects 106a, 106c are shown in configuration 306, it will be understood that any number of objects from 1–N can be included in configuration 306 to meet workflow 304, where N is an integer greater than or equal to 1.

According to an example, workflow 304 can define a production goal for an industrial process or a rule for the industrial process. The configuration 306 can facilitate the linkage of one or more objects 106a, 106c to satisfy the production goal and/or production rule of the workflow 304.

In an embodiment, a user (e.g., a systems engineer) can build an application 302 linking one or more objects (e.g., Object 1 106a and Object 3 106c) in a configuration 306 to satisfy a workflow 304. The user can add the application 302 to a library 104. Before adding the application 302 to the library, the user can add metadata or other features that facilitate searches of the library. For example, the user can create a context for the application 302 and add metadata corresponding to the context to the application 302. The context can, for example, correspond to a specific machine, a specific industrial process, a specific design constraint (e.g., capacity, cycle time, or the like), a specific standard, a specific user, a specific industry, a specific customer, a specific virtual location, a specific physical location, or the like.

In an embodiment, the library can include both objects and applications. For example, the application that includes object 1 106a and object 3 106c in a configuration 306 can be stored in the library as application 1. In another embodiment, applications can become a new object and can be stored in the library as such. For example, the application that includes object 1 106a and object 3 106c can be stored as a new object, for example object A.

Figure 4:
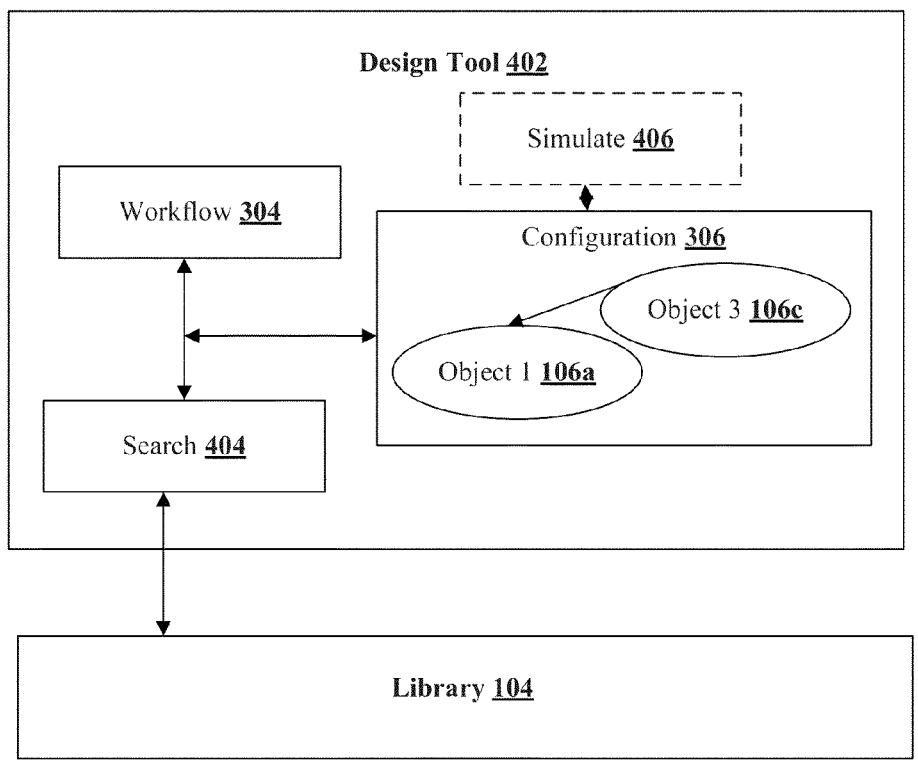
FIG. 4 is a schematic illustration of a design tool, according to an embodiment of the subject disclosure.

A user can employ a design tool 402, as shown in FIG. 4, to create applications (e.g. application 302 of FIG. 3). Design tool 402 is a dynamic tool that facilitates design of an application that corresponds to a workflow 304. The design tool 402 can examine the workflow 304 and the configuration 306 and can search 404 a library 104 for other objects that can optimize the configuration 306 for the workflow 304.

Figure 5:
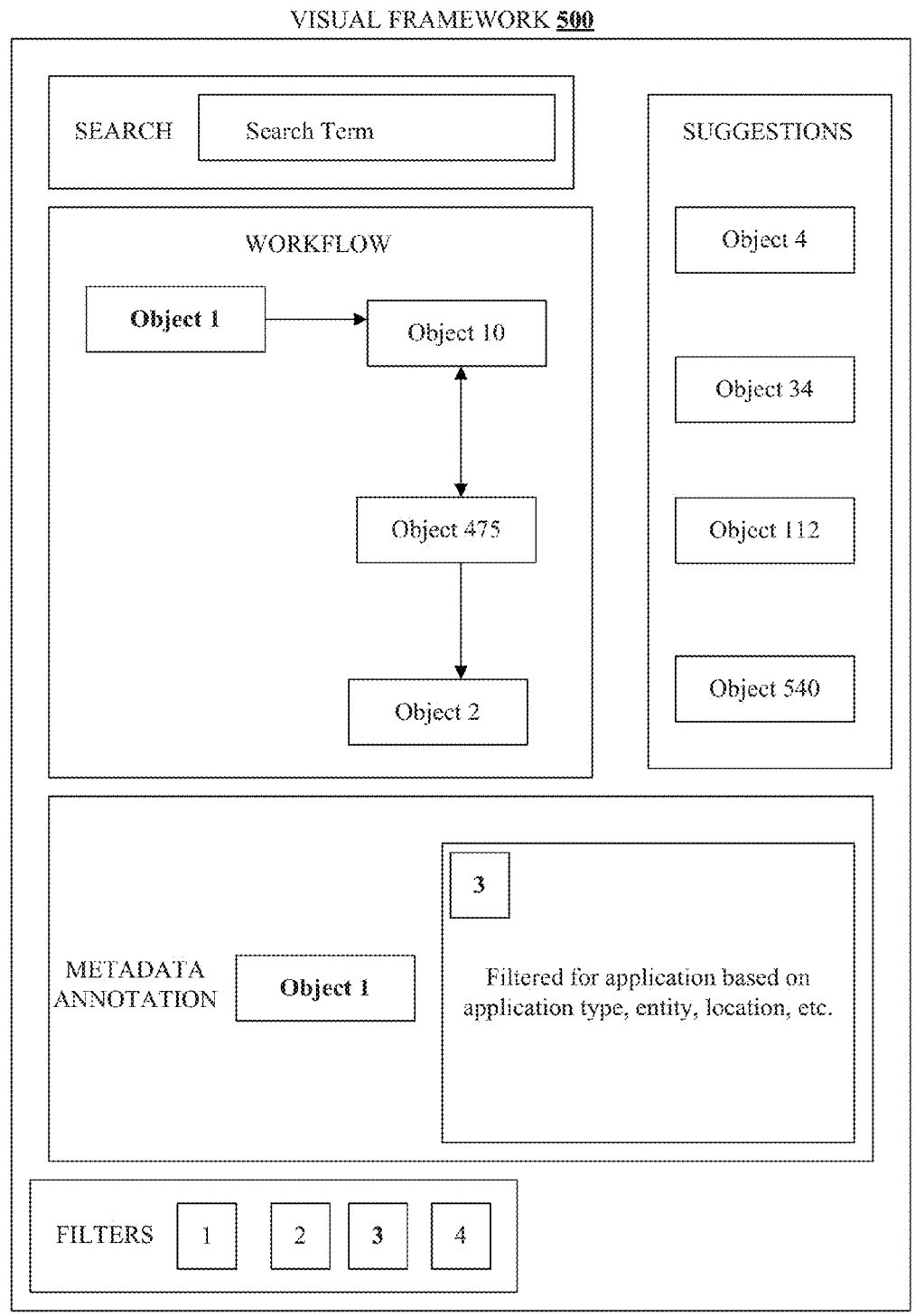
FIG. 5 is a schematic illustration of an example interface that facilitates configuration of an object for an application, according to an embodiment of the subject disclosure.

As shown in FIG. 5, design tool 402 can provide a visual framework 500 to facilitate creating and editing of applications (application 302 of FIG. 3) and objects. The visual framework 500 is merely an example of a visualization of the design tool 402. The visualization can be arranged in any number of different ways and have more or fewer functions than those displayed or discussed. For example, visual framework 500 can employ pop-ups, instant messages, tool-tips, or the like to facilitate design of objects and/or applications.

The visual framework 500 allows applications or objects to be displayed (e.g., as icons or other tools that can provide graphical representations of various function blocks) and selected from library 104 in an iconic manner. Functionalities of applications and objects can be displayed and edited. For example, the visual framework 500 can employ a drag and drop design that can facilitate creation and editing of objects and/or applications. The objects and/or applications can be created, for example, according to an optimization based design, a context based design, or the like, which is facilitated by visual framework 500.

The design tool 402 can have a search tool (e.g., a search bar) that can facilitate generation of search queries (through the entering of keywords related to the workflow, desired features, desired functionalities, or the like). The search bar allows for entering (e.g., typing) various desired features and locating suitable objects for a particular design task (e.g., via results of a search query of library 104). For example, design tool 402 can facilitate searching metadata associated with various objects in the library (or multiple libraries). The design tool 402 can provide suggestions of objects that can be employed to satisfy the workflow. The suggestions can be, for example, based on a function of objects already selected, based on a search query, based on a user context, based on a project context, based on a project goal, based on a project rule, etc.

The design tool 402 can facilitate connection of objects (e.g., Object 1, Object 10, Object 475 and Object 2 of FIG. 5) in a configuration for the workflow through the visual framework 500 as a visual design environment. The configuration can be validated, for example, based on a rule for the workflow, a goal for the workflow, an interconnectability of the objects in the configuration 306 or the like. In an embodiment, the configuration 306 can include only authorized and/or validated objects.

The design tool 402 can also include a simulation 406 feature that facilitates simulating the workflow with a proposed configuration of objects (e.g., Object 1, Object 10, Object 475 and Object 2 of FIG. 5). The simulation can be utilized, for example, in connection with testing and validating the objects (e.g., e.g., Object 1, Object 10, Object 475 and Object 2 of FIG. 5) in the configuration with respect to the workflow. The simulation can be, for example, a graphical-based logic test.

A "simulation" generally refers to any means of modeling and/or analyzing processes and flows. For example, a simulation of the workflow with the proposed configuration of objects refers to modeling and/or analyzing the projected workflow with use of the proposed configuration of objects. The simulation 406 can facilitate a determination that additional, alternate, and/or fewer objects are necessary in the configuration to facilitate the workflow.

The design tool 402 can be built on a collaborative framework that can allow multiple users to view, review, validate or co-develop the application and/or object. The collaborative frame work can allow for multiple users to perform operations on the object in real time (e.g., at the same time or at substantially the same time). For example, design tool 402 can allow for peer review and approval of the configuration or the objects (e.g., Object 1, Object 10, Object 475 and Object 2 of FIG. 5), ranking and/or weighing of different configurations or objects used in the configuration (e.g., Object 1, Object 10, Object 475 and Object 2 of FIG. 5).

The design tool 402 can use intelligence to expose the right objects for different workflows. Design tool 402 can expose objects by searching a library according to search criteria. The search criteria can be defined according to intelligence features, such as historical knowledge.

For example, the design tool 402 can generate a search for objects that have been previously used for a workflow similar to the current workflow to expose objects that can be used to facilitate the current workflow. The design tool 402 can also use intelligence related to a specific industry, a specific company, a specific user, or the like to generate further searches to expose objects that can further facilitate workflow. The exposed objects (e.g., Object 4, Object 34, Object 112 and Object 540 of FIG. 5) can be displayed as suggestions, as shown in FIG. 5.

The design tool 304 can use other types of intelligence not mentioned here. Historical knowledge has been described merely as an example of a type of intelligence.

This visual framework 500 can also include a section of filters that can facilitate masking of functionalities to allow for customizing an application based on context, rule, type or the like. As shown in FIG. 5, a filter is applied so that Object 1 only exposes metadata annotations filtered for the application. The visual framework 500 can display the metadata annotations and attributes of the object to facilitate editing and customization of annotation, ranking, editing, and the like, of the object's descriptors and/or functionalities.

Figure 6:
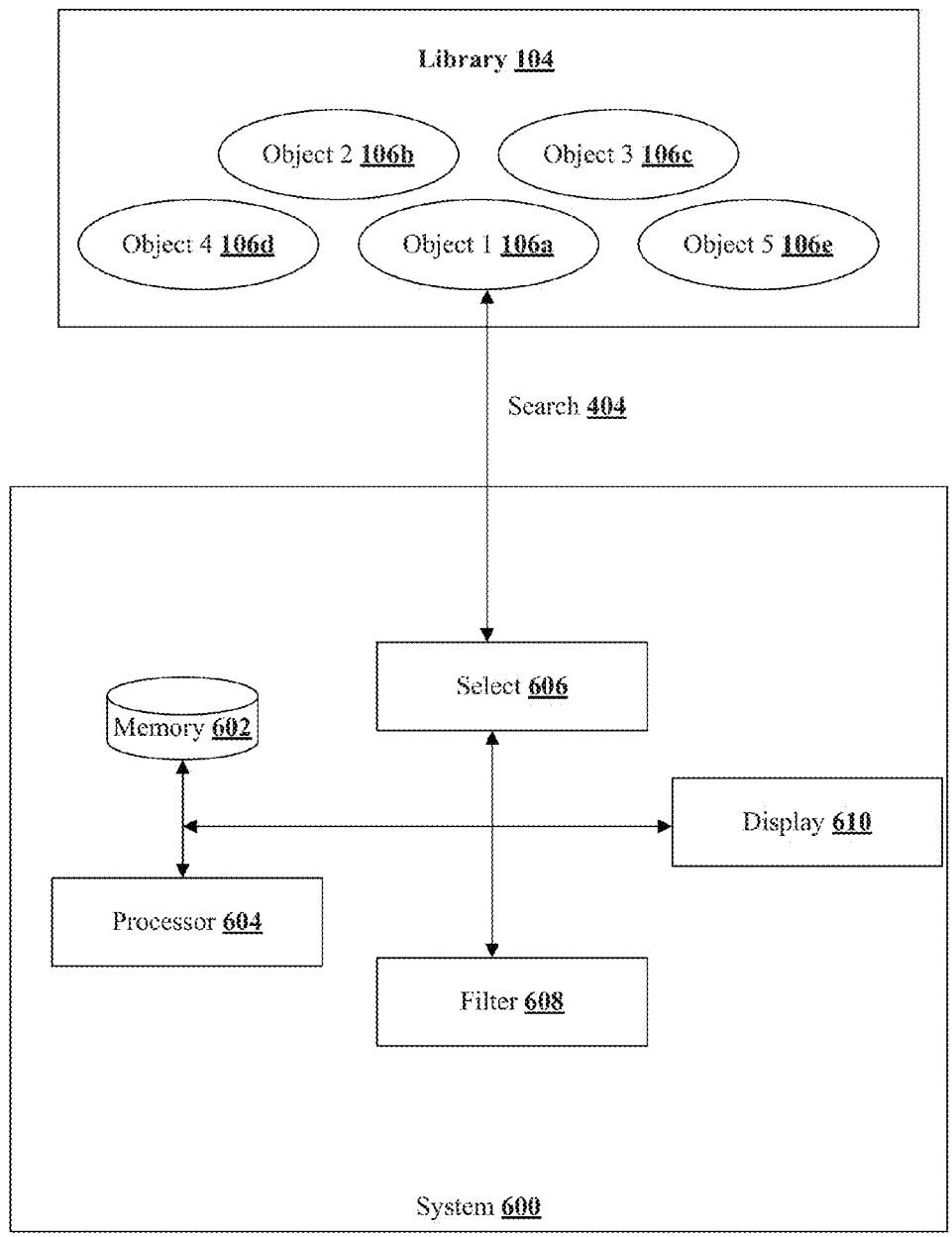
FIG. 6 is a schematic illustration of a system that facilitates customizing an object for an application, according to an embodiment of the subject disclosure.

Referring now to FIG. 6, illustrated is a system 600 that facilitates customizing an object 106a-106e for an application, according to an embodiment of the subject disclosure. System 600 includes a memory 602 that stores computer-executable instructions and a processor 604 that facilitates execution of the computer-executable instructions. The computer-executable instructions can, upon execution, at least: select 606 an object (e.g., at least one of objects 106a-106e) from a library 104 of a plurality of objects 106a-106e, filter 608 functionalities of the object based on a workflow of an application; and display 610 the object for customization of the object for the application with the filtered functionalities masked.

The library 104 can be a global library (or external library, accessible according to a public security profile) or an internal library (accessible according to a local security profile). A global library can be, for example, a library 104 hosted through a public network. For example, a global library can be in the form of a Web application. The global library can be hosted through a public server, available over the Internet, as a cloud computing solution, or the like. An internal library (or private library, accessible through a local security protocol) can be, for example, a library 104 hosted through a private network (e.g., a work place intranet, such as a factory network) or stored on a personal computer or computers. A library browser can be employed to access the global library and/or a local library. The library browser and can facilitate access to the global library according to the public security profile and access to the local library according to the private security profile.

An object can be selected 606 based on a search 404 of the library 104. The search 404 can be related to an aspect of the workflow. The aspect of the workflow can be a context, a goal, a rule, or the like. One or more objects (e.g., a plurality of objects) can be returned in response to the search 404. One or more objects can be selected 606 from the results of the search 404. The selection can be based on a context of the workflow or application, a goal of the workflow or application, a rule of the workflow or application, or the like. For example, the context of the application can refer to a type of application, type of industry, type of process, type of user, type of customer, or the like. The metadata of the object can set forth data regarding context data and other data related to rules, goals, or the like.

Figure 7:
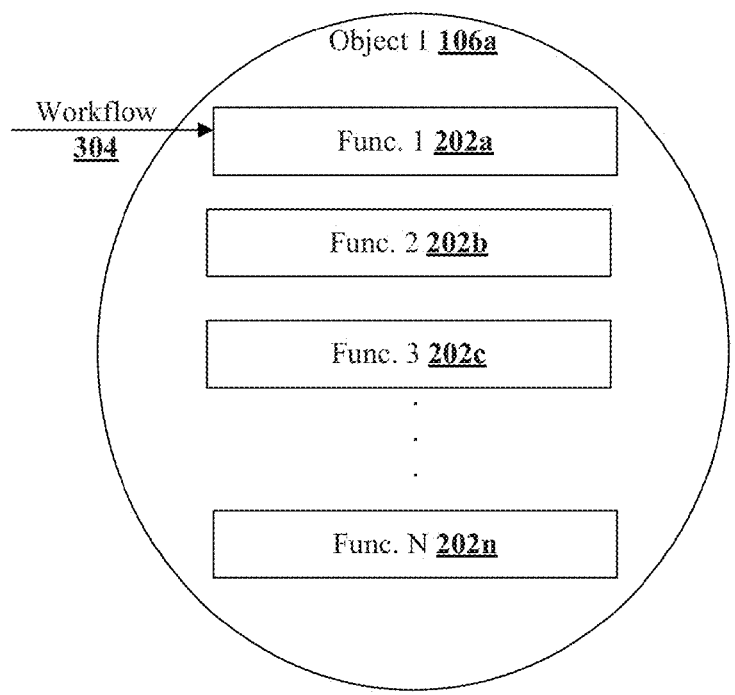
FIG. 7 is a schematic illustration of an object with a functionality corresponding to a workflow, according to an embodiment of the subject disclosure.

Upon the selection 606 of one or more objects, system 600 can filter 608 functionalities of the selected one or more objects to facilitate efficient use of the selected one or more objects for a specific context, goal, rule, or the like. As shown in FIG. 7, an object 106*a* can have multiple functionalities 202*a*-202*n* (n is an integer greater than 1). The functionalities can, for example, be related to different contexts, rules, goals, or the like. Examples of functionalities can include a diagnostic functionality, a prognostic functionality, an alarm functionality, an event functionality, a notification functionality, or the like. Further examples of functionalities include compliance functionalities, authorship functionalities, time stamping functionalities, certification functionalities, inheritance functionalities, auto-correction functionalities, security functionalities, versioning functionalities, etc.

Figure 8:
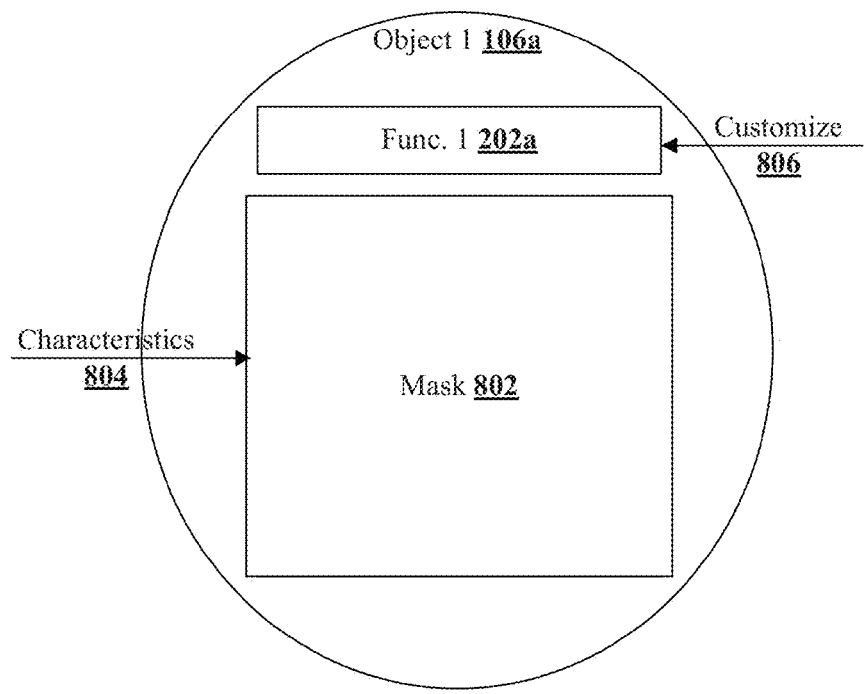
FIG. 8 is a schematic illustration of an object with masked functionalities, according to an embodiment of the subject disclosure.

FIGS. 7 and 8 show different views of an example object (Object 1 106*a*). FIG. 7 shows a repository view of object 106*a* with exposed functionalities 202*a*-202*n*, while FIG. 8 shows a masked repository view of the object 106*a* with some functionalities (Functionality 2 202*b*-Functionality N 202*n*) masked 802 with one functionality 202*a* exposed. It will be understood that any number of functionalities can be masked depending on requirements of workflow 304. One unmasked functionality is shown for ease of illustration and explanation.

As shown in FIG. 7, a workflow 304 can correspond to a specific functionality (e.g., corresponding to Functionality 1 202*a* in FIG. 7). It will be understood that the workflow 304 can correspond to more than one functionality. Correspondence to single functionality is shown for simplicity of illustration and explanation. For example, the workflow 304 can have a context, goal, rule, or the like, corresponding to a specific functionality (Functionality 1 202*a* of FIG. 7).

The functionality corresponding to the workflow 304 (Functionality 1 202*a* as shown in FIG. 8) can be left unmasked, while the other functionalities 202*b*-202*n* are masked 802. Masking functionalities that do not correspond to the workflow 304 can facilitate customization 806 of the exposed functionality 202*a* for the workflow. The other functionalities can be masked based on certain characteristics 804 of the workflow 304. For example, the functionalities 202*a*-202*n* can be masked according to a role of an entity that selects and/or customizes the object, a type of application corresponding to the workflow 304, or any other context, role or goal of the workflow 304.

The unmasked functionality (e.g., Functionality 1 202*a* in FIG. 8) can be displayed 610 (e.g., as part of the visual framework 500 of FIG. 5) to enable customization 806 of the functionality 202*a*, the object 106*a*, or the application. The functionality 202*a*, the object 106*a*, or the application can be customized 806 based, for example, on an input from a user or other entity within an industrial automation system.

Figure 9:
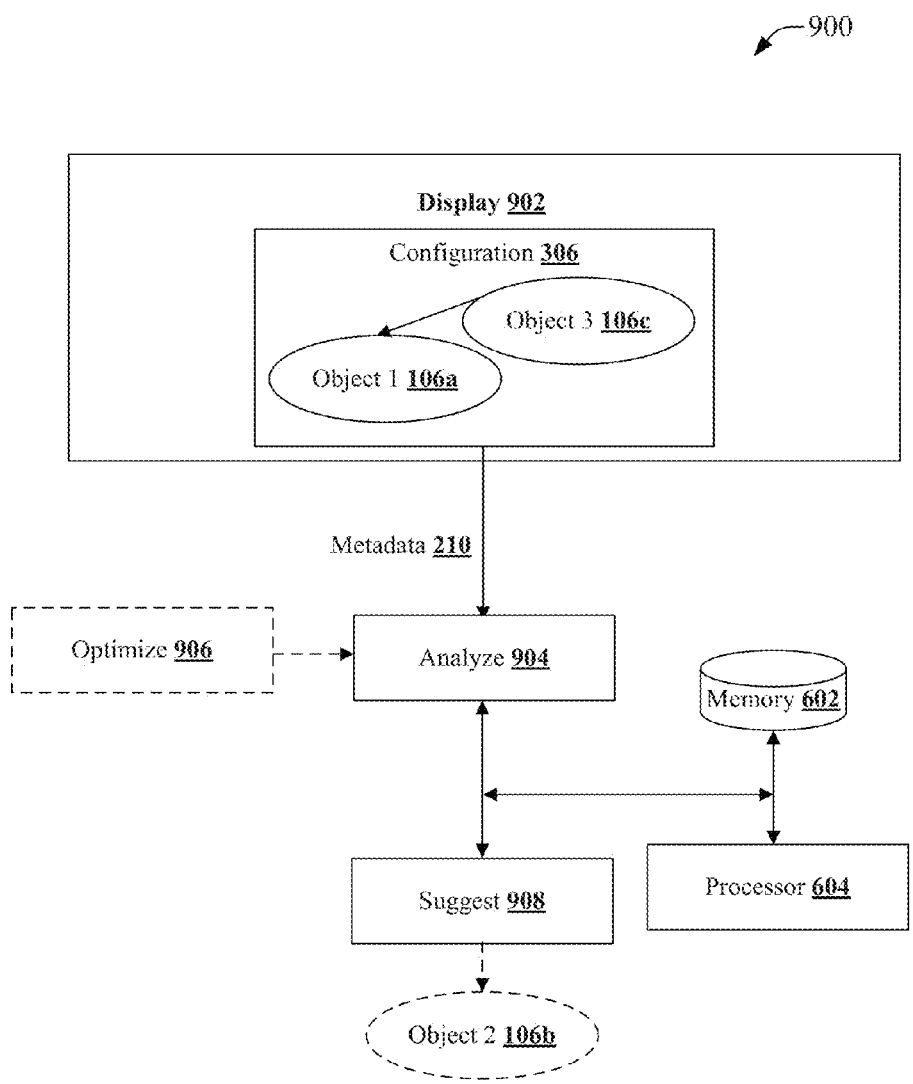
FIG. 9 is a schematic illustration of a system that can provide suggestions for objects that can be utilized in a configuration to optimize workflow of an application, according to an embodiment of the subject disclosure.

Referring now to FIG. 9, illustrated is a system 900 that can provide suggestions for objects that can be utilized in a configuration to optimize workflow of an application, according to an embodiment of the subject disclosure. System 900 includes a memory 602 that stores computer-executable instructions and a processor 604 that facilitates execution of the computer-executable instructions. The computer-executable instructions can, upon execution, at least: display 902 a configuration 306 of objects (e.g., Object 1 106*a* and Object 3 106*c*) selected for an application; analyze 904 metadata 210 associated with an object or objects from the configuration 306 of objects (e.g., Object 1 106*a* and Object 3 106*c*) corresponding to a workflow; and provide a suggestion 908 regarding an optimization 906 of the configuration 306 of the objects (e.g., Object 1 106*a* and Object 3 106*c*) for the application based on the analysis 904 of the metadata 210. In other words, system 900 can provide suggestions 908 regarding an optimized layout or configuration 306 of objects (e.g., Object 1 106*a* and Object 3 106*c*), identify missing objects, identify or suggest additional objects that can enhance an overall workflow or application.

System 900 can display 902 a configuration 306 of objects (e.g., Object 1 106*a* and Object 3 106*c*). The display 902 can be, for example, a part of visual framework 500 of FIG. 5. Metadata 210 of the configuration 306 (corresponding to a workflow) and/or an object or objects of the configuration (e.g., Object 1 106*a* and/or Object 3 106*c*) can be analyzed 904. The metadata can include, for example, a context, a rule, or a goal for the configuration 306 or a rule embedded within the metadata 210 for the object or objects. The analysis 904 can have a goal of optimizing the configuration 306 to satisfy the workflow.

Based on the analysis of the metadata, system 900 can suggest 908 additional objects (e.g., Object 2 106*b*) to facilitate optimization of configuration 306 with respect to the workflow. For example, system 900 can employ intelligence to facilitate the analysis 904.

One example of intelligence that can be employed by system 900 is historical knowledge. The historical knowledge can be based on a context, a rule, a goal, or the like. For example, the metadata 210 of configuration 306 related to the type of workflow can be analyzed 904 and objects that have previously been used for similar workflows can be suggested. The similar workflows can be discovered based on, for example, a specific industry, a similar industry, a specific company, a specific user, or the like. The suggested 908 objects can facilitate workflow or provide additional features to the workflow. System 900 can use other types of intelligence not mentioned here. Historical knowledge has been described merely as an example of a type of intelligence.

The object (e.g., Object 2 106*b*) can be suggested 908 to enhance the configuration 306 based on the workflow or a functionality of the application tied to the workflow. For example, the object suggested 908 based on the analysis 904 can be an object missing from configuration 306 without which the workflow will not satisfy a context, a rule, or a goal. System 900 can analyze 904 the configuration 306 by simulating the configuration 306 and identifying potential missing objects from the configuration.

Figure 10:
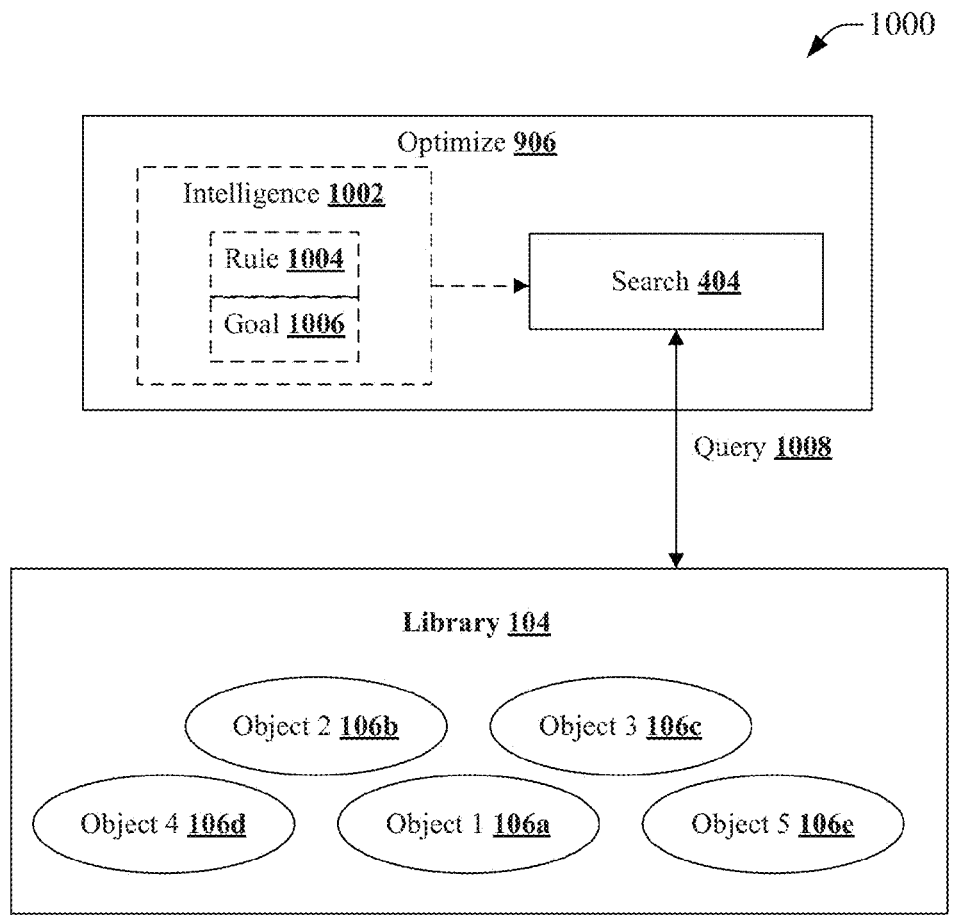
FIG. 10 is a schematic illustration of an example system that facilitates optimization of an application, according to an embodiment of the subject disclosure.

FIG. 10 is a schematic illustration of an example system 1000 that facilitates optimization 906 of an application, according to an embodiment of the subject disclosure. System 1000 can be used, for example, in the analysis 904 of system 900. In system 900, the analysis 904 can be based on an optimization 906 of a configuration 306 related to a workflow or an application corresponding to the workflow. The system 1000 can facilitate the optimization 906 of the configuration according to a search 404 of a library 104 of objects according to a query 1008.

In an embodiment, the query 1008 can be developed based on a context, a rule 1004 or a goal 1006 of the workflow or the application. In response to the analysis based on context, the rule 1004, or the goal 1006, a query 1008 can be developed to facilitate a search 404 of a library 104 for an object or objects that can be suggested to satisfy the context, the rule 1004 or the goal 1006. Intelligence 1002 can be utilized to facilitate the analysis.

It is to be understood that "intelligence 1002" can refer to a variety of artificial intelligence tools. For example, machine learning and reasoning (MLR) can be employed to infer terms for the search query 1008. More particularly, the intelligence 1002 can employ MLR to learn by monitoring context, decisions being made, user feedback, and the like. The MLR can take as input aggregate learned rules (from other users), context of a most recent decision, rules involved in the most recent decision and decision reached, any explicit user feedback, any implicit feedback that can be estimated, and current set of learned rules. From these inputs, the MLR can produce (and/or update) a new set of learned rules to generate the search query 1008 with search terms inferred according to the new set of learned rules.

A process for determining implicit feedback that can be employed by MLR can be facilitated via an automatic classifier system and process. A classifier is a function that maps an input attribute vector, x=(x1, x2, x3, x4, xn), to a confidence that the input belongs to a class, that is, f(x)=confidence (class). Such classification can employ a probabilistic, statistical and/or decision theoretic-based analysis (e.g., factoring into the analysis utilities and costs) to prognose or infer an action that a user desires to be automatically performed.

A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. By defining and applying a kernel function to the input data, the SVM can learn a non-linear hypersurface. Other directed and undirected model classification approaches include, e.g., decision trees, neural networks, fuzzy logic models, naïve Bayes, Bayesian networks and other probabilistic classification models providing different patterns of independence can be employed.

As will be readily apparent, the intelligence 1002 can employ classifiers that are explicitly trained (e.g., via a generic training data) as well as implicitly trained (e.g., via observing user behavior, receiving extrinsic information). For example, the parameters on an SVM are estimated via a learning or training phase. Thus, the classifier(s) can be used to automatically learn and perform a number of functions, including but not limited to determining according to a predetermined criteria how/if implicit feedback should be employed in the way of a rule.

Based on results of the search query 1008, system 900 of FIG. 9 can suggest 908 an additional object or objects that would optimize 906 the configuration 306 based on the workflow, the application or the analysis 904 of the metadata 210. The suggestion 908 can be based further on the search query 1008 and/or results of the search query 1008. The suggestion 908 can also be based on the context, the rule 1004, or the goal 1006. For example, the suggestion 908 can be based on a role of an entity that has constructed the configuration. In other words, for example, a systems engineer can be suggested a different object or objects than a process engineer.

Figure 11:
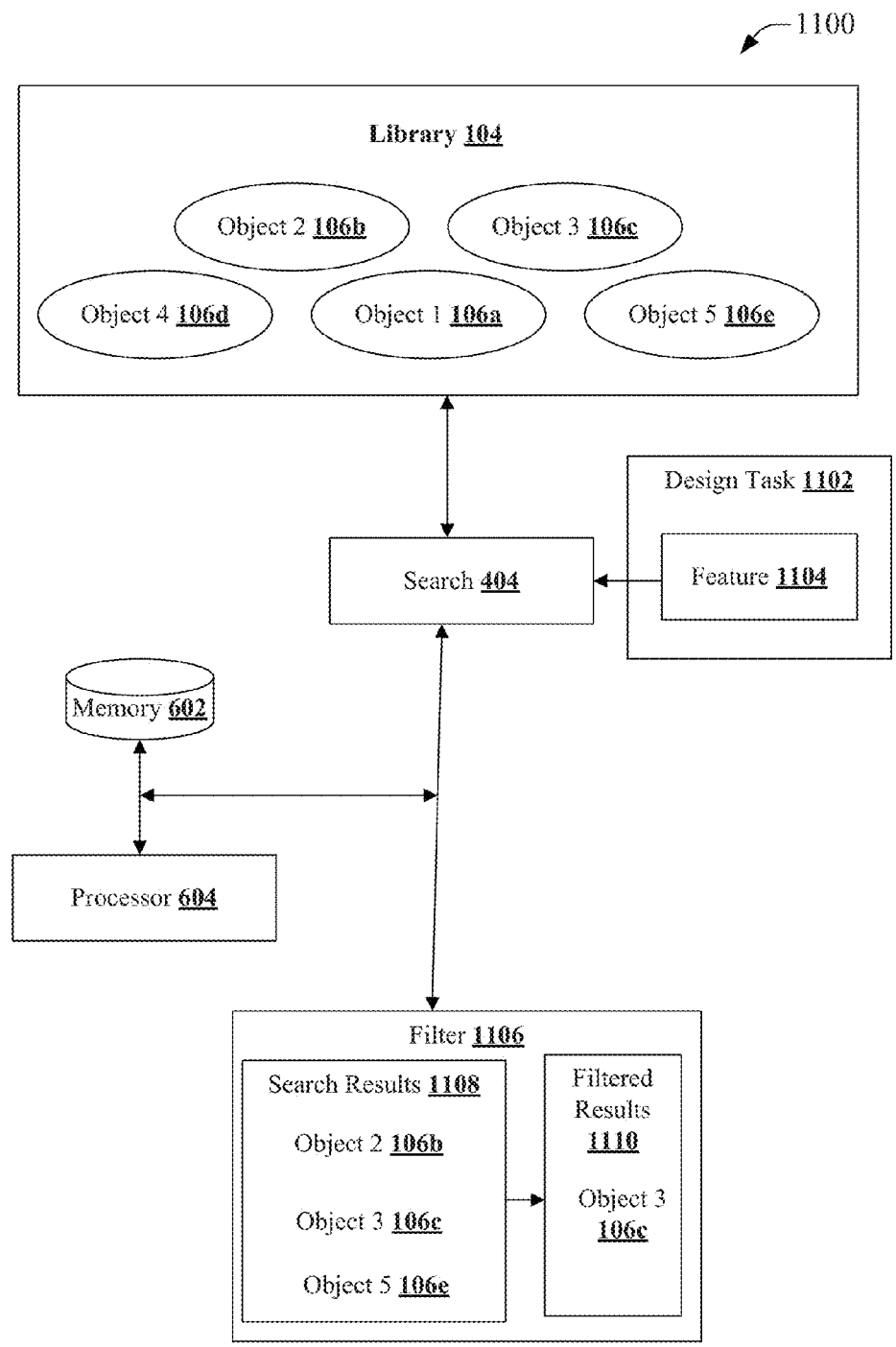
FIG. 11 is a schematic illustration of a system that facilitates finding an object that corresponds to a design task, according to an embodiment of the subject disclosure.

Referring now to FIG. 11, illustrated is a system 1100 that facilitates finding an object 106a-106e that corresponds to a design task 1102, according to an embodiment of the subject disclosure. System 1100 includes a memory 602 that stores computer-executable instructions and a processor 604 that facilitates execution of the computer-executable instructions. The computer-executable instructions can, upon execution, at least: search 404 for an object (e.g., one or more of Object 1 106a-Object 5 106e) to be used in a design task 1102 according to a feature 1104 of the design task; retrieve a plurality of search results 1108 corresponding to a plurality of objects (e.g., Object 2 106b, Object 3 106c and Object 5 106e) satis- fying the feature 1104 of the design task 1002; and filter 1106 the plurality of search results 1108.

The search 404 can return any number of objects (e.g., Object 2 106b, Object 3 106c and Object 5 106e) that satisfy the feature 1104 (or multiple features) of the design task 1102 as search results 1108. The search results 1108 can be filtered 1106 to provide a smaller amount of objects (e.g., Object 3 106c) to a user. Although a single object is shown as a filtered result 1110 of FIG. 11, it will be understood that any number of objects can be returned as filtered result 1110. In an example, a user can have the ability to limit the number of filtered results 1110 (or suggestions) to avoid cases where hundreds of results are returned.

The filter 1106 can, for example, filter the search results 1108 based on a feature of the design task 1102. Examples of features of the design task 1102 include the type of design task 1102, components (hardware device and/or software) of the design task 1102, process related to the design task 1102, or the like.

The filter 1106 can also, according to another example, filter the search results 1108 based on a goal or a rule for the design task 1102. The goal can be a production goal or any other goal related to the process. The rule can be any rule related to the industrial process. An example of a rule is an object validation rule. An object validation rule can allow for only validated objects or authorized objects to be returned from the search 404.

Filter 1106 can also filter the plurality of search results according to a context of an entity that conducts the search. The context of the entity can include information, such as, a role (e.g., management, operator, maintenance, or the like), an industry, a location, or the like.

Any number of search results 1108 can be supported based on the underlying infrastructure of the industrial automation system that system 1100 is employed within. In an embodiment, the infrastructure can support more than thousands of search results 1108. The filter 1106 can employ a design wizard 1200, as illustrated in FIG. 12, to refine the filtering of the search results 1108.

Figure 12:
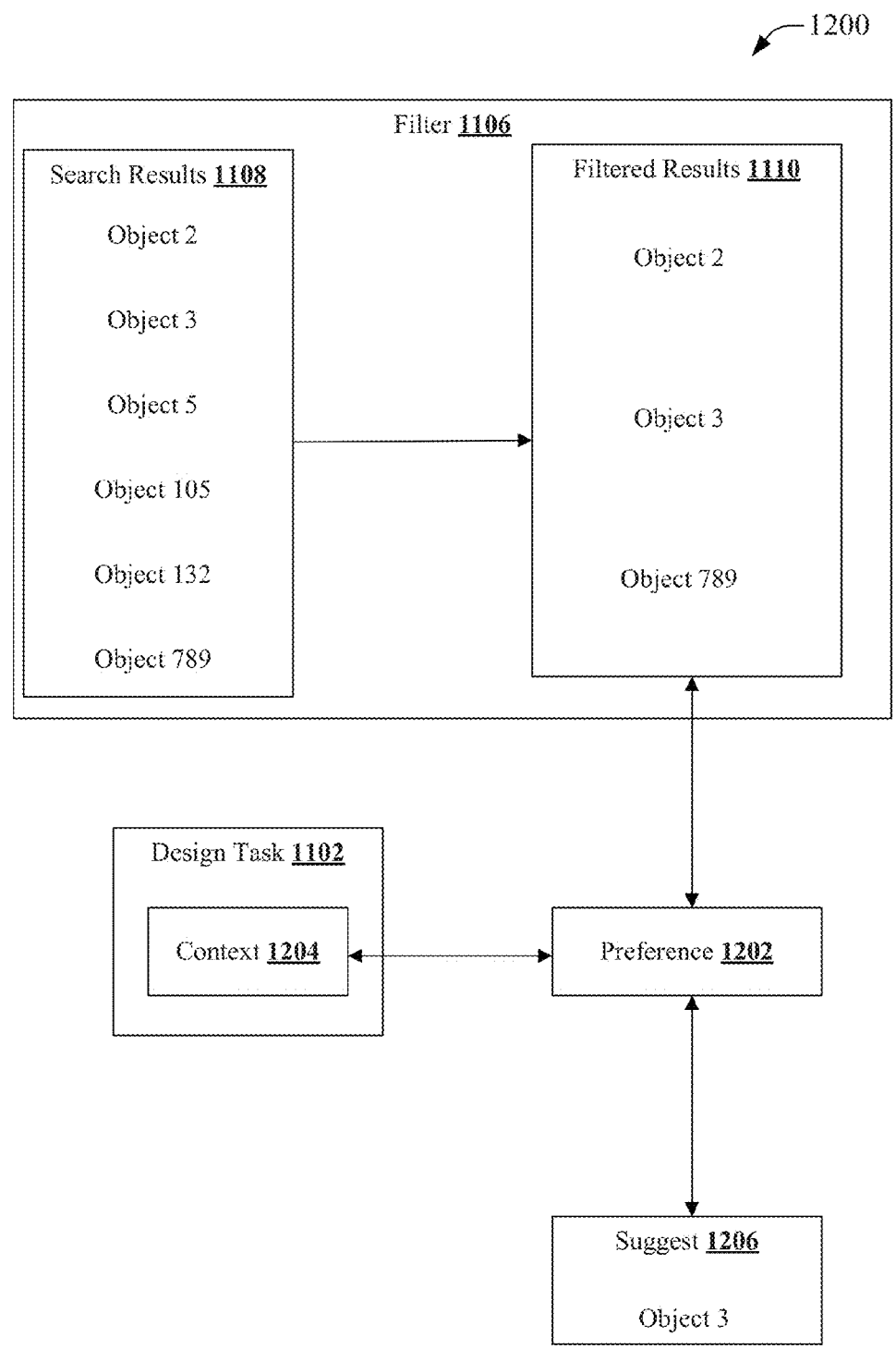
FIG. 12 is a schematic illustration of an example system that facilitates choosing an object for a design task, according to an embodiment of the subject disclosure.

As shown in FIG. 12, the design wizard 1200 can further filter the filtered results 1110 based on a preference 1202 (selecting one or more preferred objects). The preferred objects (Object 3 in FIG. 12, but it will be understood that more than one object can be the preferred object) can be suggested 1206 to a developer. The preferred object can be suggested 1206 to the user according to any method, such as an interrupt (e.g., a pop up notification, an auto-fill, a prompt, etc.) or any other means of notification.

The suggestion can be based on an aspect of design task 1102. The aspect of the design task 1102 can be a context (type of industry, identity of an employer, a standard, a role of a user, or the like) of the design task 1102, a goal of the design task 1102, a rule of the design task 1102, a specific component (hardware or software) of the design task 1102, a usage requirement of the design task 1102, or any other aspect of the design task 1102. Additionally, an entity can input one or more filtering criteria, and filter 1106 can and trim the search results 1108 to objects targeted to a developer's needs, based the filtering criteria input by the entity, in addition to predefined filtering criteria. The design wizard 1200 can employ any means of further filtering the filtered results 1110 that can facilitate suggestion 1206 of the preferred result that can be used to satisfy the design task 1102, facilitating the design of the associated application.

Figure 13:
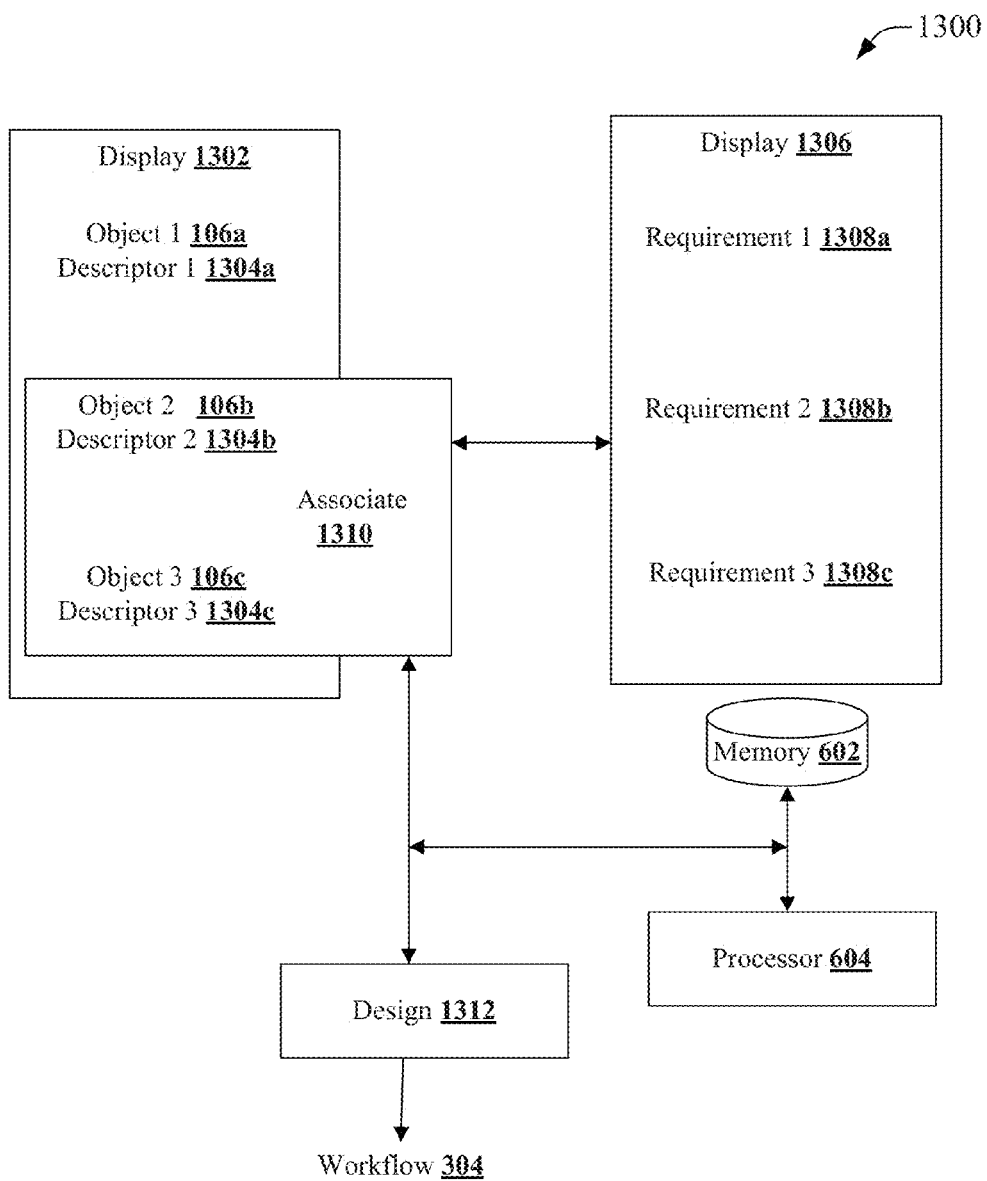
FIG. 13 is a schematic illustration of an example system that facilitates associating objects that satisfy requirements of a design task to facilitate design of a work flow of an application, according to an embodiment of the subject disclosure.

Referring now to FIG. 13, illustrated is a system 1300 that facilitates associating 1310 objects (e.g., Object 2 and Object 3) that satisfy requirements 1308a-1308c of a design task to facilitate design 1312 of a work flow 304 of an application, according to an embodiment of the subject disclosure. System 1300 includes a memory 602 that stores computer-executable instructions and a processor 604 that facilitates execution of the computer-executable instructions. The computer-executable instructions can, upon execution, at least: display 1302 a set of objects 106a-106c associated with a set of descriptors 1304a-1304c; display 1304 a set of functionalities 1308a-1308c required for an application; associate 1310 a portion of the set of objects 106b and 106c with the set of functionalities 1308a-1308c, wherein the portion of the set of descriptors 1304b and 1304c associated with the portion of the set of objects 106b and 106c matches the set of functionalities 1308a-1308c; and design 1312 workflow 304 based on the portion of the set of objects 106b and 106c.

Displays 1302 and 1306 can be on the same screen or different screens in any configuration that can facilitate the operation of system 1300. Additionally, display 1306 need not be displayed on a monitor; rather display 1306 can be a list of requirements that is entirely in software.

Display 1302 includes a set of objects 106a-106c, where each object 106a-106c is associated with one or more descriptors 1304a-1304c. The descriptors 1304a-1304c can include metadata associated with the associated object 106a-106c. The metadata can include an annotation describing features of the associated object. The annotation can assist in the matching of a requirement (1308a-1308c of Display 1306) to one or more objects 106b, 106c as shown in FIG. 13. Although only three objects 106a-106c and three requirements 1308a-1308c are shown for simplicity of illustration and explanation, it will be understood that any number of objects from 1–N and any number of requirements from 1–M can be displayed, where N and M are both integers greater than or equal to 1.

Once the object or objects 106b, 106c are matched to the requirements 1308a-1308c, a workflow 304 and/or an application can be designed 1312. The workflow 304 and/or the application can be designed with objects 106a, 106c in any configuration that satisfies the requirements 1308a-1308c. The descriptors 1304b, 1304c can be annotated or edited based on the design 1313. For example, the descriptors 1304b, 1304c can be annotated or edited based on the creator, the company, the industry, or the like) and/or the workflow (the process, the product, the time, or the like.

The objects 106a-106c of display 1302, in an embodiment, can be ranked based on the associated descriptor 1304a-1304c. In an example, the descriptor can include a timestamp (e.g., of creation, editing, or the like) and the objects 106a-106c can be ranked based on the timestamp. An object with a more recent time stamp can be ranked more highly than an object with a less recent timestamp. It will be understood that the objects 106a-106c can be ranked based on any quality present in the associated descriptor 1304a-1304c. Additionally, the objects 106b. 106c can be edited to fit the requirements 1308a-1308c.

In an embodiment, system 1300 can be a graphical design tool for the workflow 304. Objects 106b, 106c of display 1302 can be graphically connected to form the workflow 304. Further, objects 106b, 106c can be displayed with a shape, a color, or any other feature indicating that they can connect, while object 106c can be displayed with a different shape, color, or other feature indicating that it cannot connect. The display 1302 can include any feature that facilitates connection of objects 106b, 106c that can connect to form the workflow 304 and/or the application to facilitate the design 1312.

FIGS. 14-21 show methods illustrated as flow diagrams, in accordance with one or more embodiments of the subject application. For simplicity of explanation, the methods are depicted and described as series of acts. However, the methods are not limited by the acts illustrated and by the order of the acts. For example, acts can occur in various orders and/or concurrently, and with other acts not presented and described herein. Furthermore, not all illustrated acts may be required to implement the methods. The acts of the methods can be performed by a system including a processor.

Additionally, it should be further appreciated that the methods can be implemented on one or more articles of manufacture (e.g., a non-transitory computer-readable storage medium having computer-executable instructions for performing the acts and/or events of the various methods stored thereon) to facilitate transporting and transferring the methods. Non-transitory computer readable media can include, but are not limited to, magnetic storage devices (e.g., hard disk, floppy disk, magnetic strips . . . ), optical disks [e.g., compact disk (CD), digital versatile disk (DVD) . . . ], smart cards, and flash memory devices (e.g., card, stick, key drive . . . ), and the like. Further yet, two or more of methods can be implemented in combination with each other, to accomplish one or more features or advantages described herein.

Figure 14:
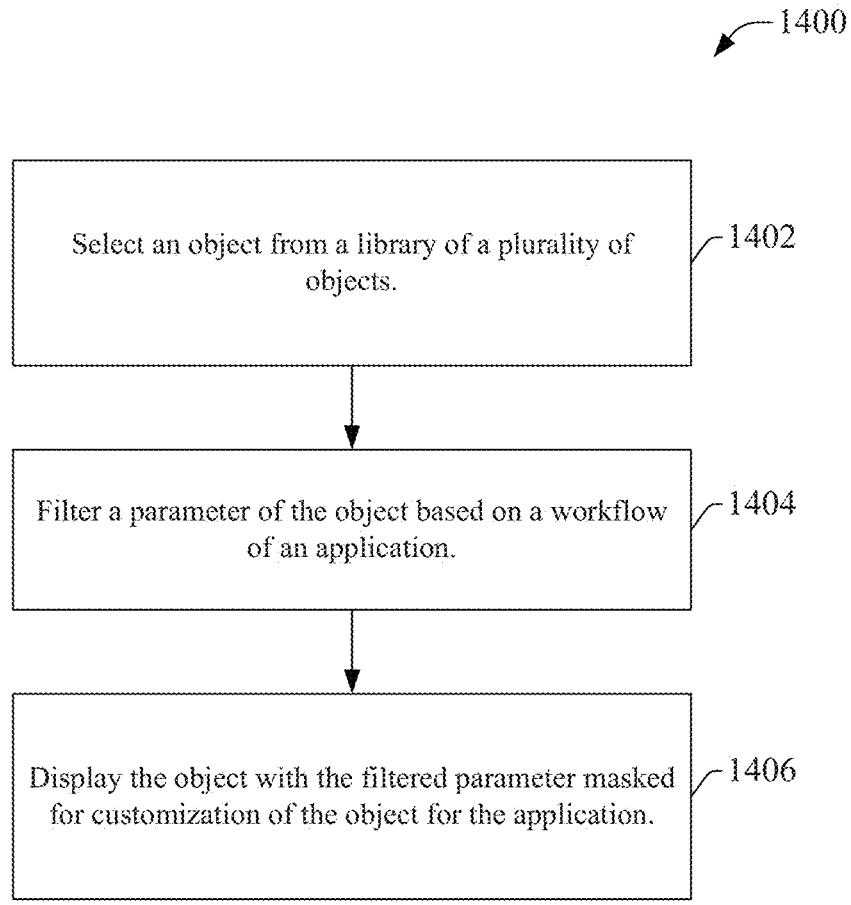
FIG. 14 is a process flow diagram illustrating a method for filtering parameters of an object to facilitate configuration of the object for an application, according to an embodiment of the subject disclosure.

Referring now to FIG. 14, is a process flow diagram of a method 1400 for filtering parameters of an object to facilitate configuration of the object for an application, according to an embodiment of the subject disclosure. At element 1402, an object is selected from a library of a plurality of objects. The library can be a global library (or external library, accessible according to a public security profile) or an internal library (accessible according to a local security profile). A global library can be, for example, a library hosted through a public network. For example, a global library can be in the form of a Web application. The global library can be hosted through a public server, available over the Internet, as a cloud computing solution, or the like. An internal library (or private library, accessible through a local security protocol) can be, for example, a library hosted through a private network (e.g., a work place intranet, such as a factory network) or stored on a personal computer or computers.

The selection can be based on a search of the library of the plurality of objects. The search can be based on an aspect of a workflow associated with an application. For example, the workflow can be analyzed, and the search can be configured based on the analysis of the workflow. The analysis can be conducted to find one or more objects in the library that can optimize the workflow or a configuration associated with the workflow.

In another example, the search can further be based on a search query that can be defined based on a context of the application (corresponding, for example, to a specific machine, a specific industrial process, a specific industry, a specific standard, a specific user, a specific industry, a specific customer, a specific virtual location, a specific physical location, or the like), a goal of the application, a rule associated with the application, or any other criterion related to the application. The search query can search metadata associated with the objects in the library to facilitate discovery of objects from the library that satisfy the query.

One or more objects can be returned in response to the search and at least one of the returned objects can be selected. The selection can be based on a context of the workflow or application, a goal of the workflow or application, a rule of the workflow or application, or the like. For example, the context of the application can refer to a type of application, type of industry, type of process, type of user, type of customer, or the like. The metadata of the object can set forth data regarding context data and other data related to rules, goals, or the like.

Upon the selection of the object, at element 1404, a parameter of the object is filtered based on a workflow of an application. The parameter can be filtered to facilitate efficient use of the object for a specific context, goal, rule, or the like, associated with the workflow. For example, the workflow can define a production goal for an industrial process or a rule for the industrial process.

An object can have multiple parameters corresponding to various functionalities. The functionalities can be related to different contexts, rules, goals, or the like. Examples of functionalities can include a diagnostic functionality, a prognostic functionality, an alarm functionality, an event functionality, a notification functionality, or the like. Further examples of functionalities include compliance functionalities, authorship functionalities, time stamping functionalities, certification functionalities, inheritance functionalities, auto-correction functionalities, security functionalities, versioning functionalities, etc. The workflow can correspond to one or more specific functionalities. For example, the workflow can have a context, goal, rule, or the like, corresponding to the context, goal, rule, or the like, of a specific functionality.

The parameters that do not correspond to the specific functionality can be masked, while the parameters corresponding to the specific functionality can be left unmasked. At element 1406, the object is displayed with the filtered parameter masked for customization of the object for the application. Masking parameters of functionalities that do not correspond to the workflow can facilitate customization of the exposed parameter of the specific functionality for the workflow.

The parameters corresponding to functionalities other than the specific functionality can be masked based on certain characteristics of the workflow. For example, the parameters of functionalities other than the specific functionality can be masked according to a role of an entity that selects and/or customizes the object, a type of application corresponding to the workflow, or any other context, role or goal of the workflow.

The unmasked parameter corresponding to the specific functionality can be displayed to enable customization of the parameter, the specific functionality, the object, or the application. The parameter, the specific functionality, the object, or the application can be customized based, for example, on an input from a user or other entity within an industrial automation system.

Figure 15:
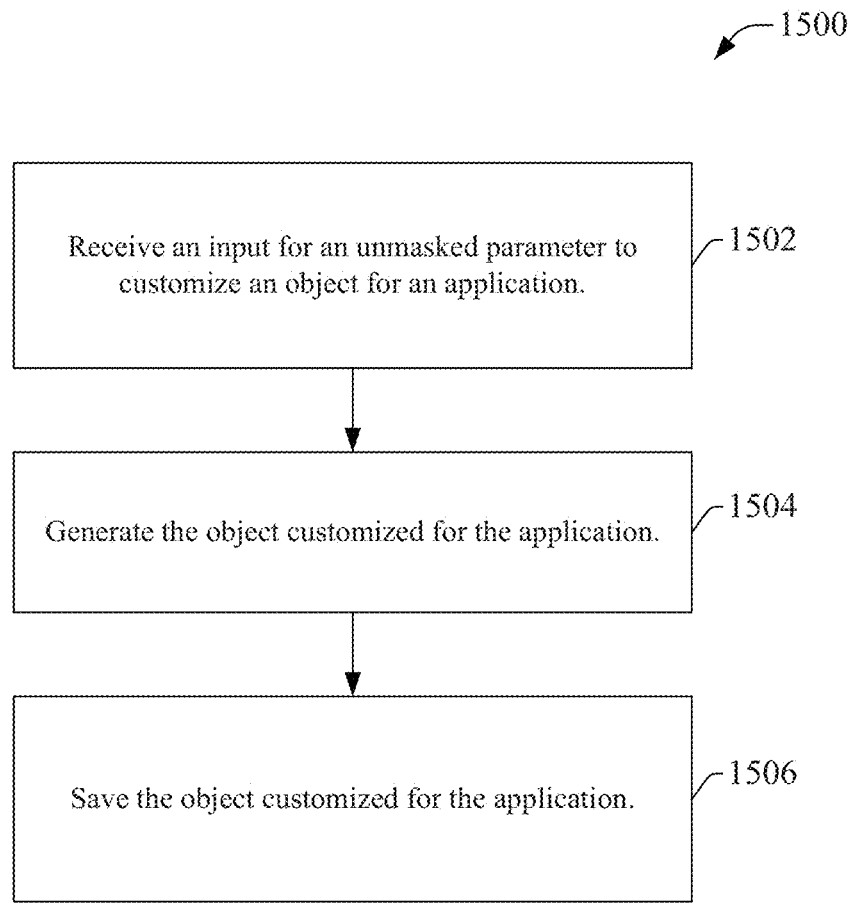
FIG. 15 is a process flow diagram illustrating a method for customizing an object for an application, according to an embodiment of the subject disclosure.

Referring now to FIG. 15, illustrated is a process flow diagram of a method 1500 for customizing an object for an application, according to an embodiment of the subject disclosure. At element 1502, an input is received for an unmasked parameter to customize an object for an application. At element 1504, the object is generated customized for the application. The object can include a descriptor or metadata with information describing the application or parameters associated with the application (e.g., context, rule, goal, or the like). At element 1506, the object is saved customized for the application. The object can be saved in an internal library accessible according to a local security protocol or in an external library accessible according to a global security profile.

Figure 16:
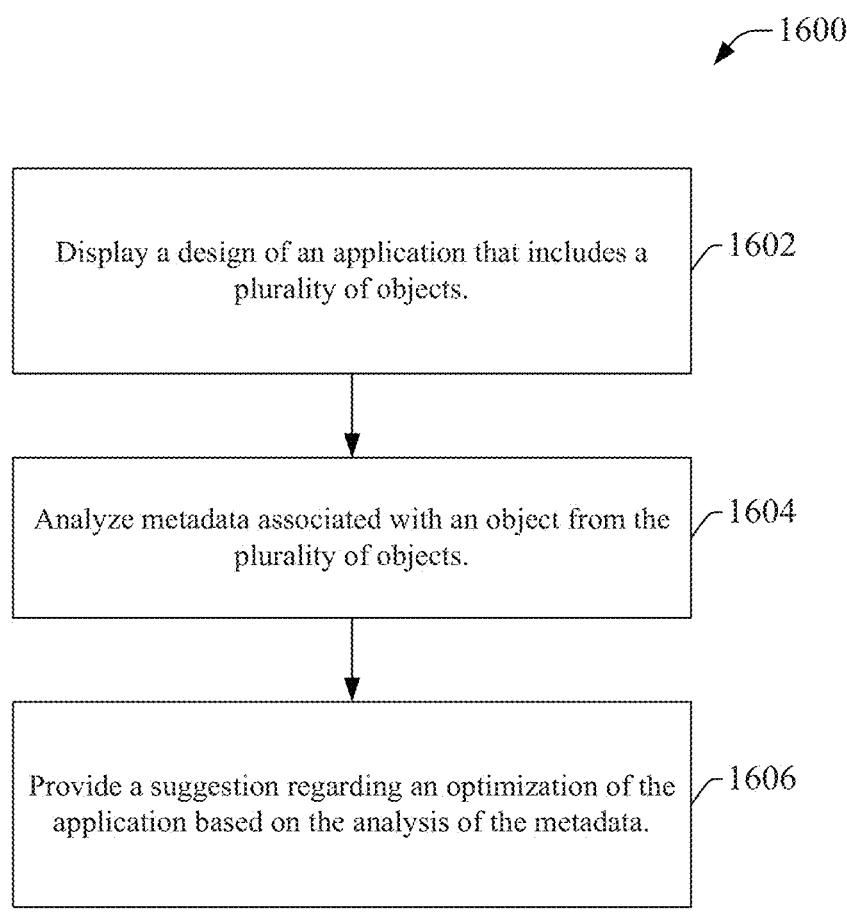
FIG. 16 is a process flow diagram illustrating a method for optimizing an application, according to an embodiment of the subject disclosure.

Referring now to FIG. 16, illustrated is a process flow diagram of a method 1600 for optimizing an application, according to an embodiment of the subject disclosure. At element 1602, a design of an application including a plurality of objects is displayed. The display, according to an example, can be a configuration of the plurality of objects within the application. The design of the application can be displayed, for example, in connection with a design tool (such as the design tool of FIG. 5).

Metadata of the plurality of objects can be displayed in connection with the plurality of objects. At element 1604, metadata associated with an object from the plurality of objects can be analyzed. The metadata can include, for example, a context, a rule, or a goal for the configuration. The analysis can have a goal of optimizing the configuration to satisfy the workflow. Based on the analysis of the metadata, at element 1606, a suggestion can be provided regarding an optimization of the application. The suggestion can suggest, for example, additional objects to facilitate an optimization of the configuration with respect to the workflow.

The analysis can be based on intelligence. One example of intelligence that can be employed in the analysis is historical knowledge. The historical knowledge can be based on a context, a rule, a goal, or the like. For example, the metadata of the configuration related to the type of workflow can be analyzed and objects that have previously been used for similar workflows can be suggested. The similar workflows can be discovered based on, for example, a specific industry, a similar industry, a specific company, a specific user, or the like. The suggested objects can facilitate workflow or provide additional features to the workflow. Other types of intelligence not mentioned here to facilitate the analysis. Historical knowledge has been described merely as an example of a type of intelligence.

The object can be suggested to enhance the configuration based on the workflow or a functionality of the application tied to the workflow. For example, the object suggested based on the analysis can be an object missing from configuration without which the workflow will not satisfy a context, a rule, or a goal. The analysis can be performed via a simulation. Based on results of the simulation, potential missing objects from the configuration can be identified and suggested.

Figure 17:
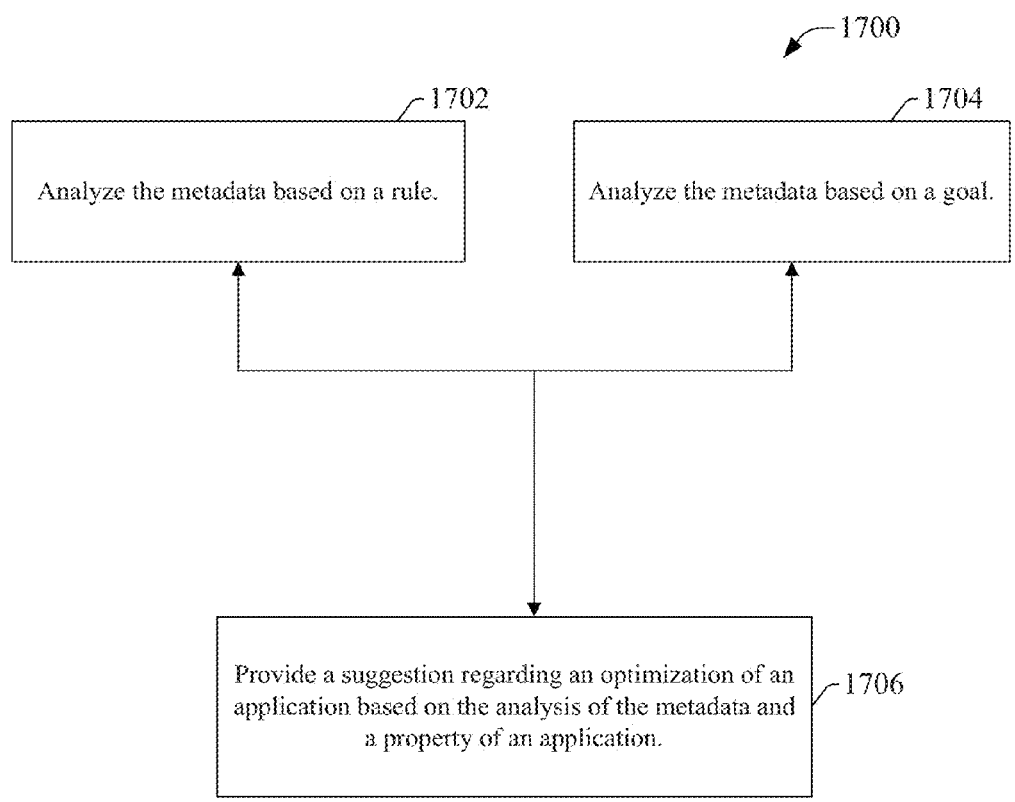
FIG. 17 is a process flow diagram illustrating a method for providing a suggestion regarding an optimization of an application, according to an embodiment of the subject disclosure.

Referring now to FIG. 17, illustrated is a process flow diagram of a method 1700 for providing a suggestion regarding an optimization of an application, according to an embodiment of the subject disclosure. Metadata associated with an application is analyzed based on a rule associated with an application at element 1702 and/or the metadata associated with the application is analyzed based on a goal associated with the application at 1704. At element 1706, a suggestion can be provided regarding an optimization of an application based on the analysis of the metadata and a property of the application. The suggestion can be provided based on a role of an entity that has constructed the application, a context of the application, a goal of the application, and/or a rule associated with the application.

The suggestion can be provided to facilitate the optimization of the application according to a search of a library of objects according to a query. In an embodiment, the query can be developed based on a context, a rule or a goal of the application. In response to the analysis based on context, the rule, or the goal, a query can be developed to facilitate the search of the library for an object or objects that can be suggested to satisfy the context, the rule or the goal. Intelligence can be utilized to facilitate the analysis.

It is to be understood that "intelligence" can refer to a variety of artificial intelligence tools. For example, machine learning and reasoning (MLR) can be employed to infer terms for the search query. More particularly, the intelligence can employ MLR to learn by monitoring context, decisions being made, user feedback, and the like. The MLR can take as input aggregate learned rules (from other users), context of a most recent decision, rules involved in the most recent decision and decision reached, any explicit user feedback, any implicit feedback that can be estimated, and current set of learned rules. From these inputs, the MLR can produce (and/or update) a new set of learned rules to generate the search query with search terms inferred according to the new set of learned rules.

A process for determining implicit feedback that can be employed by MLR can be facilitated via an automatic classifier system and process. A classifier is a function that maps an input attribute vector, x=(x1, x2, x3, x4, xn), to a confidence that the input belongs to a class, that is, f(x)=confidence (class). Such classification can employ a probabilistic, statistical and/or decision theoretic-based analysis (e.g., factoring into the analysis utilities and costs) to prognose or infer an action that a user desires to be automatically performed.

A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. By defining and applying a kernel function to the input data, the SVM can learn a non-linear hypersurface. Other directed and undirected model classification approaches include, e.g., decision trees, neural networks, fuzzy logic models, naïve Bayes, Bayesian networks and other probabilistic classification models providing different patterns of independence can be employed.

As will be readily apparent, the intelligence can employ classifiers that are explicitly trained (e.g., via a generic training data) as well as implicitly trained (e.g., via observing user behavior, receiving extrinsic information). For example, the parameters on an SVM are estimated via a learning or training phase. Thus, the classifier(s) can be used to automatically learn and perform a number of functions, including but not limited to determining according to a predetermined criteria how/if implicit feedback should be employed in the way of a rule.

Based on results of the search query, an additional object or objects that would optimize the application can be suggested based on the analysis. The suggestion can be based further on the search query and/or results of the search query. The suggestion can also be based on the context, the rule, or the goal. For example, the suggestion can be based on a role of an entity that has constructed the configuration. In other words, for example, a systems engineer can be suggested a different object or objects than a process engineer.

Figure 18:
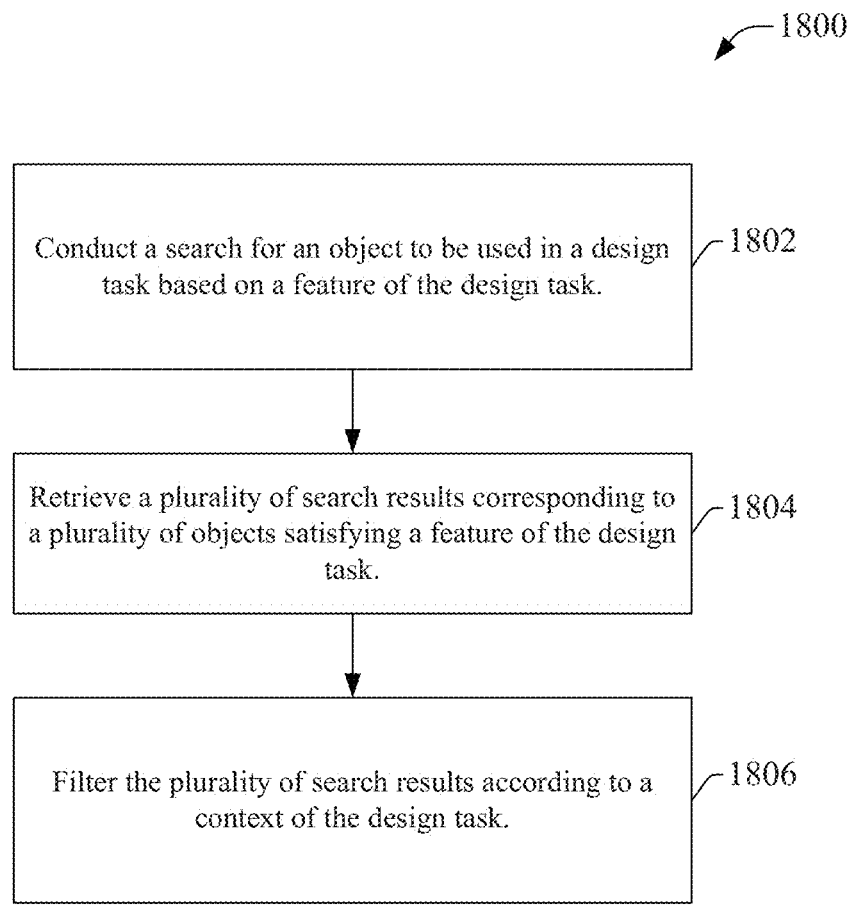
FIG. 18 is a process flow diagram illustrating a method for finding an object that corresponds to a display task, according to an embodiment of the subject disclosure.

Referring now to FIG. 18, illustrated is a process flow diagram of a method 1800 for finding an object that corresponds to a display task, according to an embodiment of the subject disclosure. At element 1802, a search is conducted for an object to be used in a design task based on a feature of the design task. The feature of the design task can be a context (e.g., user, identity of employer, location, industry type, standard, etc.), a rule, a goal, a specific component (hardware or software), or any other aspect of the design task.

At 1804, a plurality of search results corresponding to a plurality of objects satisfying a feature of the design task are retrieved. At element 1804, the plurality of search results are filtered according to a context of the design task. For example, an entity can input one or more filtering criteria, and the plurality of search results are filtered according to the filtering criteria. Accordingly, the search results can be trimmed to one or more objects that suit the needs of the entity.

Figure 19:
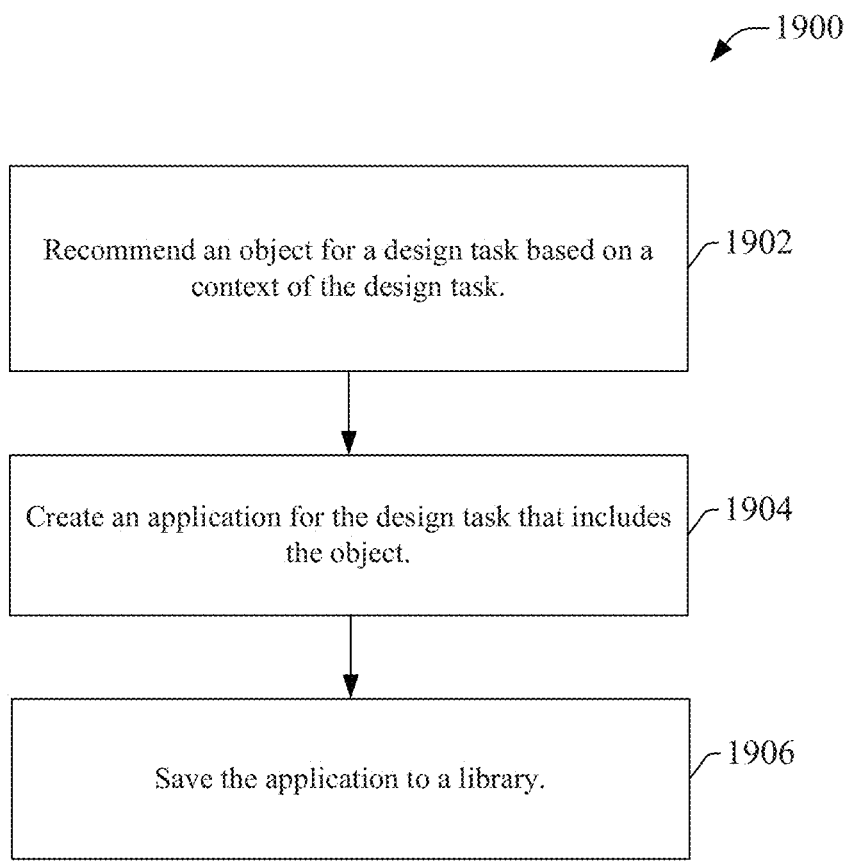
FIG. 19 is a process flow diagram illustrating a method for creating an application for a design task, according to an embodiment of the subject disclosure.

Referring now to FIG. 19, illustrated is a process flow diagram of a method 1900 for creating an application for a design task, according to an embodiment of the subject disclosure. At element 1902, an object is recommended based on a context of the design task. The context of the design task can include a user, an identity of employer, a location (logical or physical) of a component or the user, an industry type, a standard, or the like. Any type of filtering can be employed to filter results of a search to facilitate a recommended result. The recommended result can be suggested to a user (e.g., as a prompt, pop-up window, or other interrupt), and the recommended result can be used to facilitate the design of an associated application. For example, the recommended result can optimize the design of the associated application. According to another example, the recommended result can be recommended based on compatibility with other objects of the application.

At element 1904, an application is created for the design task including the object. At element 1906, the application is saved. The application can be saved in connection with metadata that indicates the design task. The application can be saved in a public library and be accessible through a global security protocol and/or a private library and be accessible through a private security protocol. Saving the application facilitate reuse of the application with minimal effort used for design, with the only effort expended on customization.

Figure 20:
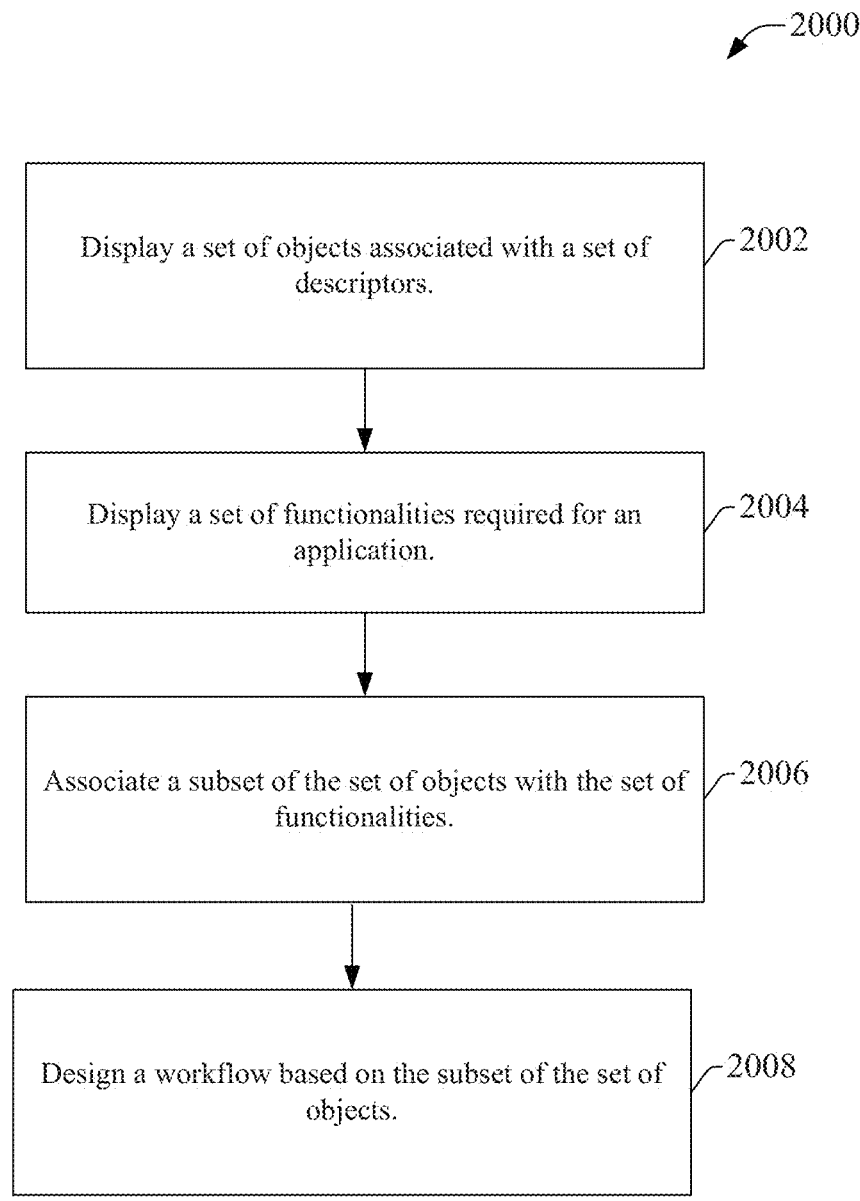
FIG. 20 is a process flow diagram illustrating a method for designing a workflow for an application, according to an embodiment of the subject disclosure.

Referring now to FIG. 20, illustrated is a process flow diagram of a method 2000 for designing a workflow for an application, according to an embodiment of the subject disclosure. At element 2002, a set of objects associated with a set of descriptors is displayed. At element 2004, a set of functionalities required for an application is displayed. The display of the objects and the display of the functionalities can be on the same screen or different screens in any configuration that can facilitate the designing a workflow for an application. Additionally, the objects and the functionalities need not be displayed on a monitor and can be entirely in software.

Each object of the set of objects is associated with one or more descriptors. The descriptors can include metadata associated with the associated object. The metadata can include an annotation describing features of the associated object.

The annotation can assist in the matching of a functionality to one or more objects that satisfy the functionality. At element 2006, a subset of the set of objects is associated with the set of functionalities. The association can be done graphically (e.g., shape, color, or the like).

At element 2008, a workflow is designed based on the subset of the objects. The subset of the objects can be arranged in any configuration that satisfies the features of the workflow. The descriptors can be annotated or edited based on the design. For example, the descriptors can be annotated or edited based on the creator, the company, the industry, or the like.

Figure 21:
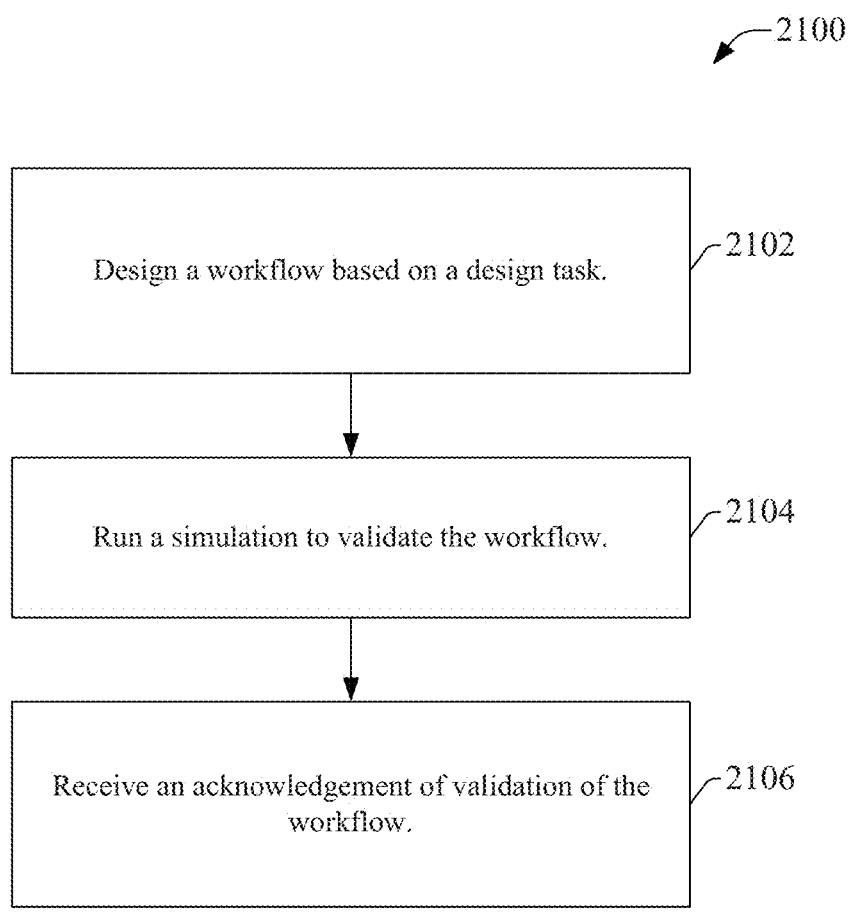
FIG. 21 is a process flow diagram illustrating a method for validating a workflow design, according to an embodiment of the subject disclosure.

Referring now to FIG. 21, illustrated is a process flow diagram of a method 2100 for validating a workflow design, according to an embodiment of the subject disclosure. At element 2102, a workflow is designed for a design task. At element 2104, a simulation is run to validate the workflow. The simulation can be performed by an entity, a group of entities, or a supervisor of the entities. At element 2106, an acknowledgement of validation of the workflow is received. Upon receipt of the validation, the workflow can be implemented within an industrial automation system.

Figure 22:
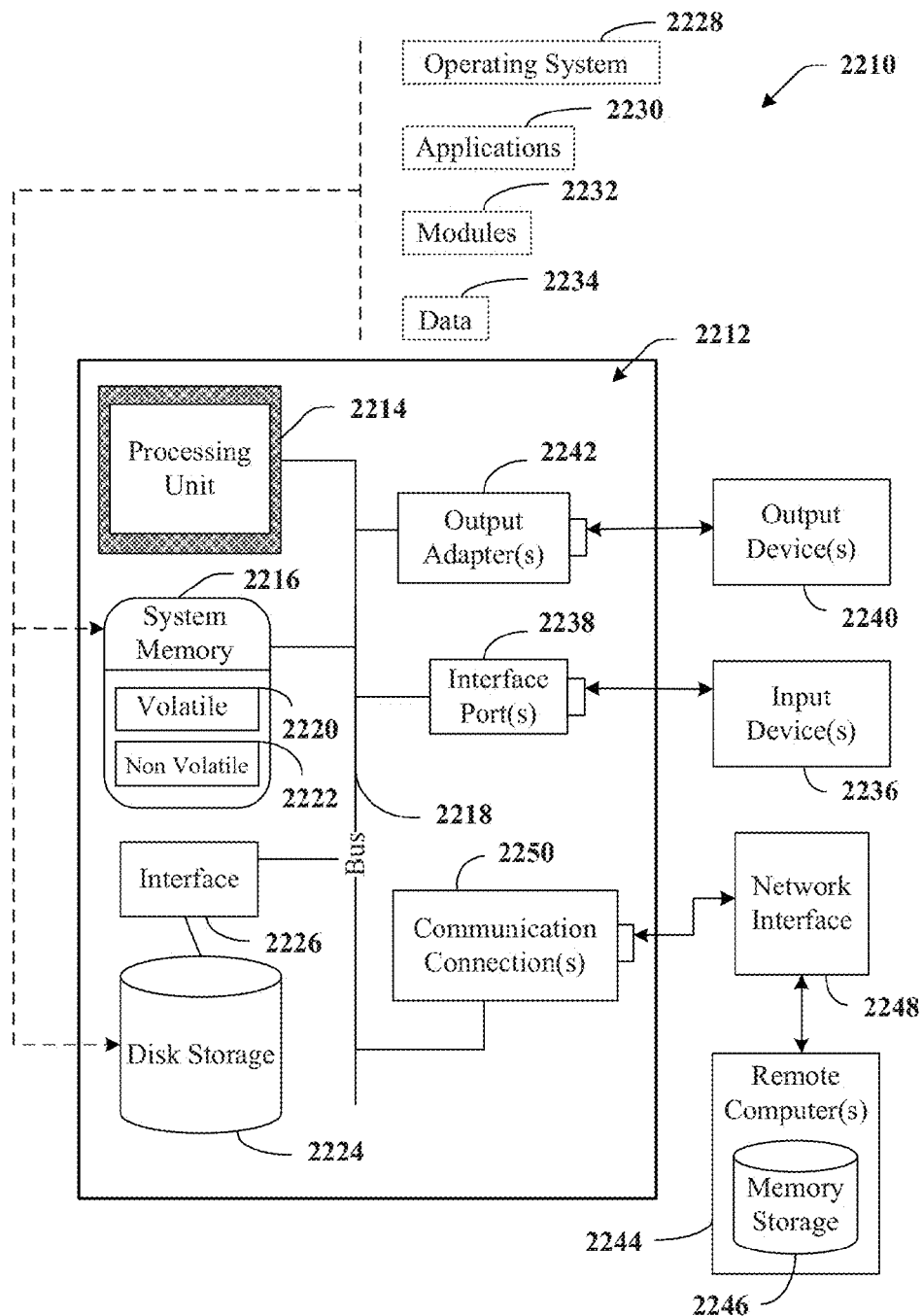
FIG. 22 illustrates an example computing environment in which the various embodiments described herein can be implemented.
Figure 23:
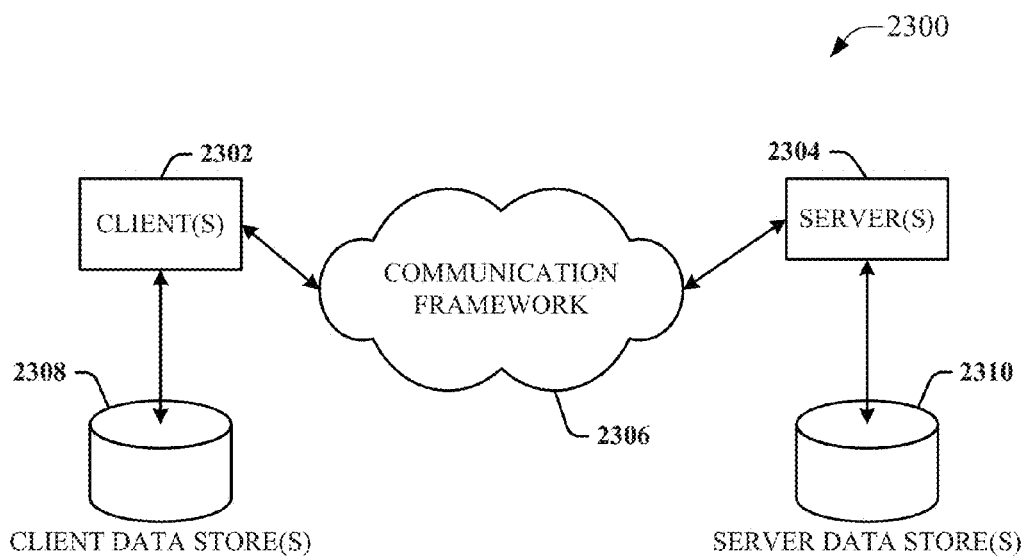
FIG. 23 illustrates an example of a computer network in which various embodiments described herein can be implemented.

In order to provide a context for the various aspects of the disclosed subject matter, FIGS. 22 and 23, as well as the following discussion, are intended to provide a brief, general description of a suitable environment in which the various aspects of the disclosed subject matter can be implemented.

The environment can be implemented within an industrial automation system to facilitate industrial automation applications Industrial automation systems, such as industrial control systems and industrial automation environments, in which various aspects set forth in the subject specification can be carried out, can include computer or network components such as servers, clients, programmable logic controllers (PLCs), automation controllers, communications modules, mobile computers, wireless components, control components and so forth which are capable of interacting across a network. Computers and servers include one or more processors-electronic integrated circuits that perform logic operations employing electric signals-configured to execute instructions stored in media such as random access memory (RAM), read only memory (ROM), a hard drives, as well as removable memory devices, which can include memory sticks, memory cards, flash drives, external hard drives, and so on.

Similarly, the term PLC or automation controller as used herein can include functionality that can be shared across multiple components, systems, and/or networks. As an example, one or more PLCs or automation controllers can communicate and cooperate with various network devices across the network. This can include substantially any type of control, communications module, computer, Input/Output (I/O) device, sensor, actuator, and human machine interface (HMI) that communicate via the network, which includes control, automation, and/or public networks. The PLC or automation controller can also communicate to and control various other devices such as I/O modules including analog, digital, programmed/intelligent I/O modules, other programmable controllers, communications modules, sensors, actuators, output devices, and the like.

The network can include public networks such as the internet, intranets, and automation networks such as Common Industrial Protocol (CIP) networks including DeviceNet, ControlNet, and EtherNet/IP. Other networks include Ethernet, DH/DH+, Remote I/O, Fieldbus, Modbus, Profibus, CAN, wireless networks, serial protocols, and so forth. In addition, the network devices can include various possibilities (hardware and/or software components). These include components such as switches with virtual local area network (VLAN) capability, LANs, WANs, proxies, gateways, routers, firewalls, virtual private network (VPN) devices, servers, clients, computers, configuration tools, monitoring tools, and/or other devices.

With reference to FIG. 22, an example computing environment 2210 that can be utilized in an industrial automation system to facilitate implementing various aspects of the aforementioned subject matter. The environment 2210 includes a computer 2212. The computer 2212 includes a processing unit 2214, a system memory 2216, and a system bus 2218. The system bus 2218 couples system components including, but not limited to, the system memory 2216 to the processing unit 2214. The processing unit 2214 can be any of various available processors. Multi-core microprocessors and other multiprocessor architectures also can be employed as the processing unit 2214.

The system bus 2218 can be any of several types of bus structure(s) including the memory bus or memory controller, a peripheral bus or external bus, and/or a local bus using any variety of available bus architectures including, but not limited to, 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 2216 includes volatile memory 2220 and nonvolatile memory 2222. The basic input/output system (BIOS), containing the basic routines to transfer information between elements within the computer 2212, such as during start-up, is stored in nonvolatile memory 2222. By way of illustration, and not limitation, nonvolatile memory 2222 can include read only memory (ROM), programmable ROM (PROM), electrically programmable ROM (EPROM), electrically erasable PROM (EEPROM), or flash memory. Volatile memory 2220 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 2212 also includes removable/non-removable, volatile/non-volatile computer storage media. FIG. 22 illustrates, for example a disk storage 2224. Disk storage 2224 generally includes any computer recording media that includes a recording media to retain digital data. Disk storage 2224 includes, but is not limited to, devices like a magnetic disk drive, floppy disk drive, tape drive, magnetic drive, Jaz drive, Zip drive, LS-100 drive, solid state semiconductor drive, flash memory card, or memory stick. In addition, disk storage 2224 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 2224 to the system bus 2218, a removable or non-removable interface is typically used such as interface 2226.

It is to be appreciated that FIG. 22 describes software that acts as an intermediary between users and the basic computer resources described in suitable operating environment 2210. Such software includes an operating system 2228. Operating system 2228, which can be stored on disk storage 2224, acts to control and allocate resources of the computer system 2212. System applications 2230 take advantage of the management of resources by operating system 2228 through program modules 2232 and program data 2234 stored either in system memory 2216 or on disk storage 2224. It is to be appreciated that one or more embodiments of the subject disclosure can be implemented with various operating systems or combinations of operating systems.

A user enters commands or information into the computer 2212 through input device(s) 2236. Input devices 2236 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 2214 through the system bus 2218 via interface port(s) 2238. Interface port(s) 2238 include, for example, a serial port, a parallel port, a game port, and a universal serial bus (USB). Output device(s) 2240 use some of the same type of ports as input device(s) 2236. Thus, for example, a USB port may be used to provide input to computer 2212, and to output information from computer 2212 to an output device 2240. Output adapter 2242 is provided to illustrate that there are some output devices 2240 like monitors, speakers, and printers, among other output devices 2240, which require special adapters. The output adapters 2242 include, by way of illustration and not limitation, video and sound cards that provide a means of connection between the output device 2240 and the system bus 2218. It should be noted that other devices and/or systems of devices provide both input and output capabilities such as remote computer(s) 2244.

Computer 2212 can operate in a networked environment using logical connections to one or more remote computers, such as remote computer(s) 2244. The remote computer(s) 2244 can be a personal computer, a server, a router, a network PC, a workstation, a microprocessor based appliance, a peer device or other common network node and the like, and typically includes many or all of the elements described relative to computer 2212. For purposes of brevity, only a memory storage device 2246 is illustrated with remote computer(s) 2244. Remote computer(s) 2244 is logically connected to computer 2212 through a network interface 2248 and then physically connected via communication connection 2250. Network interface 2248 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL). Computer 2210 can also operate in a wireless network (e.g., WIFI).

Communication connection(s) 2250 refers to the hardware/software employed to connect the network interface 2248 to the bus 2218. While communication connection 2250 is shown for illustrative clarity inside computer 2212, it can also be external to computer 2212. The hardware/software necessary for connection to the network interface 2248 includes, for exemplary purposes only, internal and external technologies such as, modems including regular telephone grade modems, cable modems and DSL modems, ISDN adapters, Ethernet cards and wireless modems and other wireless technologies.

FIG. 23 is a schematic block diagram of a sample-computing environment 2300 with which the disclosed subject matter can interact. The system 2300 includes one or more client(s) 2310. The client(s) 2310 can be hardware and/or software (e.g., threads, processes, computing devices). The system 2300 also includes one or more server(s) 2330. The server(s) 2330 can also be hardware and/or software (e.g., threads, processes, computing devices). The servers 2330 can house threads to perform transformations by employing one or more embodiments as described herein, for example. One possible communication between a client 2310 and a server 2330 can be in the form of a data packet adapted to be transmitted between two or more computer processes. The system 2300 includes a communication framework 2350 that can be employed to facilitate communications between the client(s) 2310 and the server(s) 2330. The client(s) 2310 are operably connected to one or more client data store(s) 2360 that can be employed to store information local to the client(s) 2310. Similarly, the server(s) 2330 are operably connected to one or more server data store(s) 2340 that can be employed to store information local to the servers 2330.

The above description of illustrated embodiments, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

As used herein, the word "example" is used herein to mean serving as an example, instance, or illustration. For the avoidance of doubt, the subject matter described herein is not limited by such examples. In addition, any aspect or design described herein as an "example" is not necessarily to be construed as preferred or advantageous over other aspects or designs, nor is it meant to preclude equivalent structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

In this regard, while the described subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims.

What is claimed is:

1. A system, comprising:
a memory, communicatively coupled to a processor, the memory having stored therein executable instructions, comprising:
a design tool configured to:
display configuration data representing a configuration of objects selected for an application;
analyze metadata associated with at least one object of the configuration of objects in relation to a production goal of a workflow associated with an industrial process; and
generate suggestion data representing a suggestion regarding an optimization of the configuration of the objects for the application based on the analysis of the metadata to satisfy the production goal of the workflow associated with the industrial process,
wherein the suggestion comprises identification of a missing object from the configuration based on the analysis of the metadata.

2. The system of claim 1, wherein the suggestion comprises an additional object to include in the configuration based on the application or the analysis of the metadata.

3. The system of claim 1, wherein the suggestion is further based on another workflow that is determined to be similar to the workflow.

4. The system of claim 1, wherein the suggestion is further based on a type of industry associated with the industrial process.

5. The system of claim 1, wherein the suggestion is further based on a type of customer associated with the industrial process.

6. The system of claim 1, wherein the suggestion is further based on a role of an entity determined to have contributed to a construction of the configuration.

7. The system of claim 1, wherein the suggestion further comprises a optimized layout of the configuration of objects based on the analysis of the metadata.

8. The system of claim 1, wherein the suggestion further comprises a ranking of the objects based on the analysis of the metadata.

9. A method, comprising:
- presenting, by a system including a processor, a display of a design of an application comprising a plurality of objects;
- analyzing, by the system, metadata associated with at least one object from the plurality of objects with respect to a production goal of a workflow associated with an industrial process; and
- generating, by the system, suggestion data representing a suggestion regarding an optimization of the application based on the analyzing of the metadata to achieve the production goal of the workflow associated with the industrial process,
- wherein the suggestion comprises identification of a missing object from the configuration based on the analysis of the metadata.

10. The method of claim 9, wherein the suggestion further comprises an additional object to include in the application based on the analyzing the metadata.

11. The method of claim 9, wherein the suggestion is further based on another workflow determined to be similar to the workflow.

12. The method of claim 9, wherein the suggestion is further based on a role of an entity determined to have contributed to constructing the application.

13. The method of claim 9, wherein the suggestion further comprises a optimized layout of the configuration of objects based on the analyzing the metadata.

14. The method of claim 9, wherein the suggestion further comprises a ranking of the objects based on the analyzing the metadata.

15. A non-transitory computer readable medium having stored thereon computer executable instructions that, in response to execution, cause a computing device including a processor to perform operations, comprising:
- displaying a configuration of an application comprising a plurality of objects;
- analyzing metadata associated with at least one object from the configuration in regard to a production goal of a workflow associated with an industrial process; and
- presenting a suggestion with which to optimize the configuration based on the analyzing the metadata to achieve the production goal of the workflow associated with the industrial process,
- wherein the suggestion comprises identification of a missing object from the configuration based on the analysis of the metadata.

16. The non-transitory computer readable medium of claim 15, wherein the suggestion further comprises an additional object to include in the configuration based on the analyzing the metadata.

17. The non-transitory computer readable storage medium of claim 15, wherein the suggestion is further based on another workflow determined to be similar to the workflow.

* * * * *